(12) United States Patent
Nonomura et al.

(10) Patent No.: US 8,570,444 B2
(45) Date of Patent: Oct. 29, 2013

(54) TELEVISION RECEIVER AND ELECTRONIC DEVICE

(75) Inventors: Junichi Nonomura, Tokyo (JP); Ryosuke Saito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/488,936

(22) Filed: Jun. 5, 2012

(65) Prior Publication Data
US 2013/0083249 A1 Apr. 4, 2013

(30) Foreign Application Priority Data
Sep. 30, 2011 (JP) ................................. 2011-218646

(51) Int. Cl.
*H04N 5/44* (2011.01)
*H04N 5/64* (2006.01)

(52) U.S. Cl.
USPC .. 348/715; 348/725; 348/E5.096; 348/E5.097

(58) Field of Classification Search
None
See application file for complete search history.

(56) References Cited

U.S. PATENT DOCUMENTS

| | | | |
|---|---|---|---|
| 5,392,461 A | 2/1995 | Yokoyama | |
| 7,783,259 B2* | 8/2010 | Dessert et al. | 455/63.1 |
| 7,880,817 B2* | 2/2011 | Jitsuhara et al. | 348/725 |
| 7,932,957 B2* | 4/2011 | Azuma et al. | 348/725 |
| 7,940,336 B2* | 5/2011 | Takatori | 348/725 |
| 8,159,611 B2* | 4/2012 | Tomonaga | 348/553 |
| 2002/0100807 A1 | 8/2002 | Minaguchi et al. | |
| 2008/0297422 A1 | 12/2008 | Ishida | |
| 2009/0147149 A1 | 6/2009 | Tomonaga | |
| 2010/0125878 A1* | 5/2010 | Jing et al. | 725/81 |
| 2011/0122044 A1 | 5/2011 | Sathath | |

FOREIGN PATENT DOCUMENTS

| | | |
|---|---|---|
| JP | 09-008526 A | 1/1997 |
| JP | 10-290175 A | 10/1998 |
| JP | 11-220420 A | 8/1999 |
| JP | 2002-217754 A | 8/2002 |
| JP | 2004-159287 A | 6/2004 |
| JP | 2004-252562 A | 9/2004 |
| JP | 2008-204922 A | 9/2008 |
| JP | 2008-301105 A | 12/2008 |
| JP | 2009-060323 A | 3/2009 |
| JP | 2011-114582 A | 6/2011 |
| JP | 2012-509642 A | 4/2012 |
| WO | WO 2010/059313 A2 | 5/2010 |
| WO | WO 2011/043377 A1 | 4/2011 |

OTHER PUBLICATIONS

Notice of Rejection mailed by Japan Patent Office on Aug. 28, 2012 in the corresponding Japanese patent application No. 2011-218646.
Notice of Rejection mailed by Japan Patent Office on Nov. 20, 2012 in the corresponding Japanese patent application No. 2011-218646.
Decision to Grant a Patent mailed by Japan Patent Office on Feb. 12, 2013 in the corresponding Japanese patent application No. 2011-218646.

* cited by examiner

*Primary Examiner* — Jay Patel
*Assistant Examiner* — Reza Aghevli
(74) *Attorney, Agent, or Firm* — Knobbe Martens Olson & Bear, LLP

(57) ABSTRACT

According to one embodiment, a television receiver includes: a display; a circuit board; a housing; an antenna; and a shield. The display includes a display screen. The circuit board is located at a side of the display opposite the display screen. The housing is configured to house the display and the circuit board. The antenna is in the housing, and includes a communication portion and a ground portion. The shield is along a periphery of the ground portion in the housing, and is located between the antenna and the circuit board.

19 Claims, 19 Drawing Sheets

TELEVISION RECEIVER AND ELECTRONIC DEVICE

CROSS-REFERENCE TO RELATED APPLICATIONS

This application is based upon and claims the benefit of priority from Japanese Patent Application No. 2011-218646, filed Sep. 30, 2011, the entire contents of which are incorporated herein by reference.

FIELD

Embodiments described herein relate generally to a television receiver and an electronic device.

BACKGROUND

There are conventionally known electronic devices that are each provided with an antenna on a side of a display device opposite a display screen.

In this type of electronic device, a configuration with fewer disadvantages in communication via an antenna is desired.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
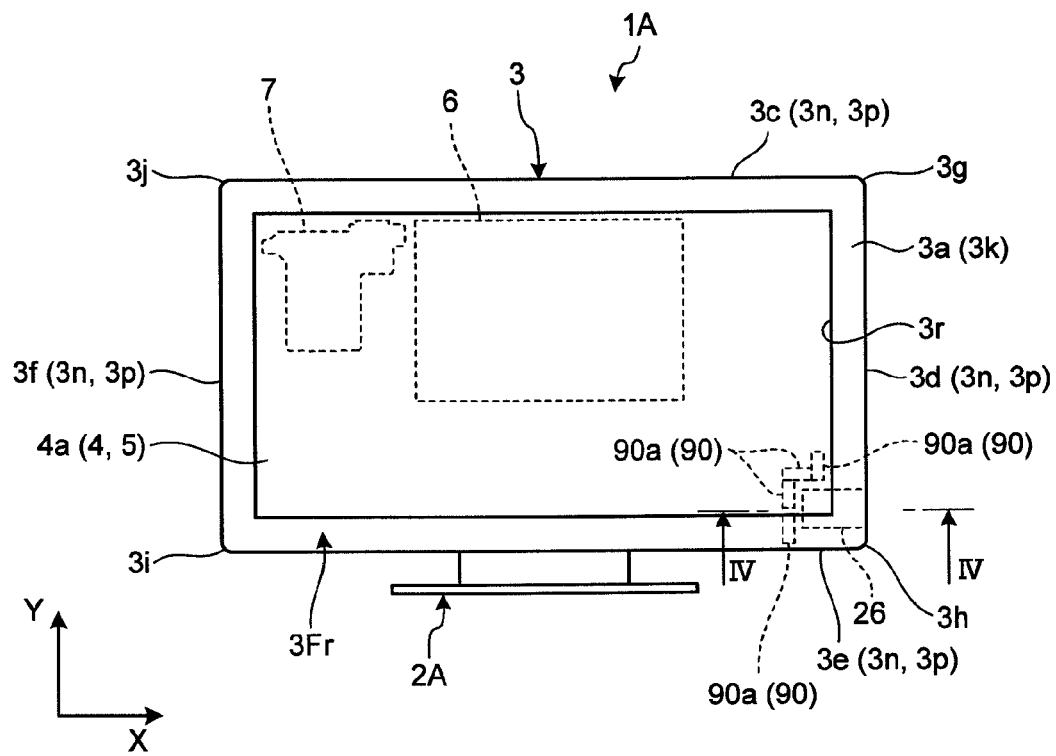
FIG. 1 is an exemplary front view of a television receiver according to a first embodiment.

In general, according to one embodiment, a television receiver comprises: a display; a circuit board; a housing; an antenna; and a shield. The display device comprises a display screen. The circuit board is located at a side of the display opposite the display screen. The housing is configured to house the display and the circuit board. The antenna is in the housing, and comprises a communication portion and a ground portion. The shield is along a periphery of the ground portion in the housing, and is located between the antenna and the circuit board.

A plurality of exemplary embodiments described below comprise components of the same type. Accordingly, in the description below, common reference numerals are assigned to components of the same type, and duplicate description will be omitted. In the drawings, directions (X, Y, and Z directions) are indicated for convenience. The X direction is a lengthwise direction in the front view of a display screen of a television receiver; the Y direction is a traverse direction in the front view of the display screen; and the Z direction is a front-rear direction (depth direction, or thickness direction of housing) in the front view of the display screen. The X, Y, and Z directions are perpendicular to each other.

Although cases will be exemplified in which an electronic device is configured as a television receiver in the embodiments described below, the electronic device according to the present embodiments is not so limited. The electronic device in the present embodiments can be configured as one of various electronic devices, such as a personal computer of a notebook type, a desktop type, a tablet type, or a slate type, a smartphone, a smart television (TV), a smartbook, a mobile phone, a personal digital assistant (PDA), a video display device, and a videophone.

Figure 2:
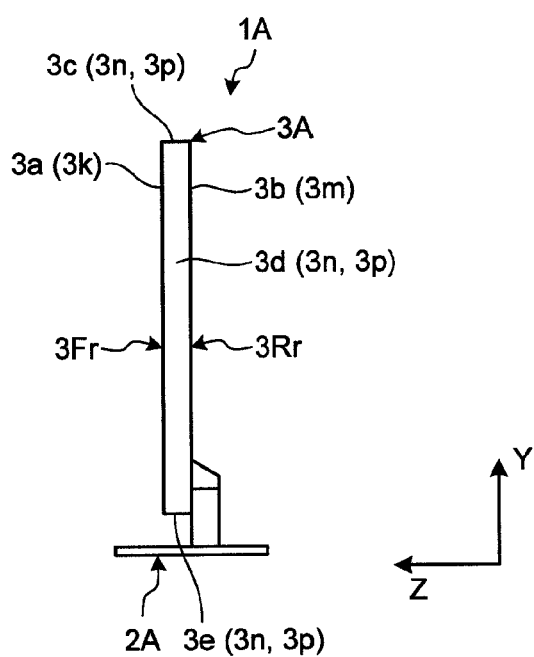
FIG. 2 is an exemplary side view of the television receiver in the first embodiment.

A television receiver 1A as an example of an electronic device according to a first embodiment comprises, as illustrated in FIGS. 1 and 2, a support (support portion, platform, or stand) 2A and a housing 3A. The support 2A is placed on a placing part (not illustrated) such as a desk, a rack, or a table, and supports the housing 3A. The support 2A may support the housing 3A in a fixed manner or in a movable (rotatable and/or slidable) manner. Modes of rotation of the housing 3A relative to the support 2A include, for example, tilting, swiveling, and pivoting.

The housing 3A is configured, as illustrated in FIG. 1, to have a rectangular shape (non-square rectangular shape as an example in the present embodiment) in a front view. The housing 3A is also configured, as illustrated in FIG. 2, to have a flat rectangular cuboid shape that is thin in the front-rear direction. The housing 3A comprises a front surface (front, surface, first surface, or first surface portion) 3a and a rear surface (rear, surface, second surface, or second surface portion) 3b opposite the front surface. The front surface 3a and the rear surface 3b are substantially in parallel with each other. The housing 3A also comprises, as illustrated in FIG. 1, four ends (sides, or edges) 3c to 3f and four corners (apexes, curves, or ends) 3g to 3j in the front view. The ends 3c and 3e are examples of longer sides. The ends 3d and 3f are examples of shorter sides.

The housing 3A also comprises a wall (first wall portion, first portion, plate, frame, front wall, face wall, or top wall) 3k comprising the front surface 3a, and a wall (second wall portion, second portion, plate, rear wall, back wall, or bottom wall) 3m comprising the rear surface 3b. The walls 3k and 3m have each a rectangular shape (non-square rectangular shape as an example in the present embodiment). The housing 3A also comprises four walls (third wall portions, third portions, plates, side walls, end walls, standing walls, or bridging portion) 3n comprising each a side surface (surface, peripheral surface, or third surface) 3p provided in a bridging manner between the wall 3k and the wall 3m. The wall 3k is provided with an opening 3r having a rectangular shape as an example.

The housing 3A can be configured by combining a plurality of components (divided bodies and/or members). The housing 3A comprises, as an example, a first member (first portion, front member, or cover) 3Fr that comprises at least the wall 3k, and a second member (second portion, rear member, base, or bottom) 3Rr that comprises at least the wall 3m. The walls 3n can be comprised in at least one of the first member 3Fr and the second member 3Rr (for example, in the second member 3Rr). In addition to the first member 3Fr and the second member 3Rr, the housing 3A comprises a third member 3Md (third portion, intermediate member, dividing member, barrier member, wall member, interposed member, inner plate, middle plate, or middle frame; see FIG. 4) that is located between the first and the second members. In that case, the walls 3n can be comprised in the third member 3Md. The housing 3A can be composed of, for example, metallic material or synthetic resin material.

A display device (display module, display, or panel) 4 is housed in the housing 3A. A display screen 4a located on the side of the front surface 3a relative to the display device 4 is exposed in front (outside) of the housing 3A via the opening 3r. Thus, a user can view the display screen 4a from the front side through the opening 3r. The display device 4 is configured to have a rectangular shape (non-square rectangular shape as an example in the present embodiment) in the front view. The display device 4 is also configured to have a flat rectangular cuboid shape that is thin in the front-rear direction. The display device 4 is, for example, a liquid crystal display (LCD) or an organic electro-luminescent display (OELD).

The display device 4 comprises, in front (on the face side, or on the side of the wall 3k) thereof, a transparent input operation panel (touchscreen, touch sensor, or operation surface as an example) 5 with a relatively thin rectangular shape. The input operation panel 5 covers the display screen 4a. An operator (such as the user) can execute input processing by performing operation such as touching, pressing, or dragging the input operation panel 5 with, for example, a finger or a stylus, or moving the finger or the stylus near the input operation panel 5. Light emitted from the display screen 4a of the display device 4 travels from the opening 3r of the wall 3k to the front (outside) of the housing 3A through the input operation panel 5. The input operation panel 5 is an example of an input module.

A plurality of boards 6 and 7 (circuit boards) are housed at the rear (on the back side, on the side behind, on the side of the wall 3m, or on the side opposite the display screen 4a) of the display device 4 in the housing 3A. The boards 6 and 7 are located at different position. Both of the boards are provided in parallel with the display device 4. The boards 6 and 7 are also provided in a state separated from the walls 3k, 3m, and 3n, that is, in the state in which spaces are provided between themselves and the walls 3k, 3m, and 3n. The boards 6 and 7 are arranged along the display device 4, and preferably do not overlap each other in the thickness direction of the housing 3A. The boards 6 and 7 are fixed to the housing 3A by fixing devices such as screws.

A plurality of electronic components (components and/or devices, not illustrated) such as a central processing unit (CPU) are mounted on the board (first board, first circuit board, control board, or main board) 6 illustrated in FIG. 1. The electronic components comprise heat generating bodies. The electronic components (heat generating bodies) generating a large amount of heat can comprise a cooling mechanism (heat dissipator, or heat receiver; not illustrated). At least a part of a control circuit not illustrated is composed of the board 6 and the electronic components. The control circuit can comprise, for example, a video signal processing circuit, a tuner, a high-definition multimedia interface (HDMI) signal processor, an audio visual (AV) input terminal, a remote-control signal receiver, a controller, a selector, an on-screen display interface, memories (such as a read-only memory (ROM), a random access memory (RAM), and a hard disk drive (HDD)), and an audio signal processing circuit. The control circuit controls, for example, output of images (such as an moving image and a still image) on the display screen 4a of the display device 4, output of sound from speakers not illustrated, and emission of light from light emitting diodes (LEDs) not illustrated. The display device 4, the speakers, and the LEDs are examples of output modules.

Figure 3:
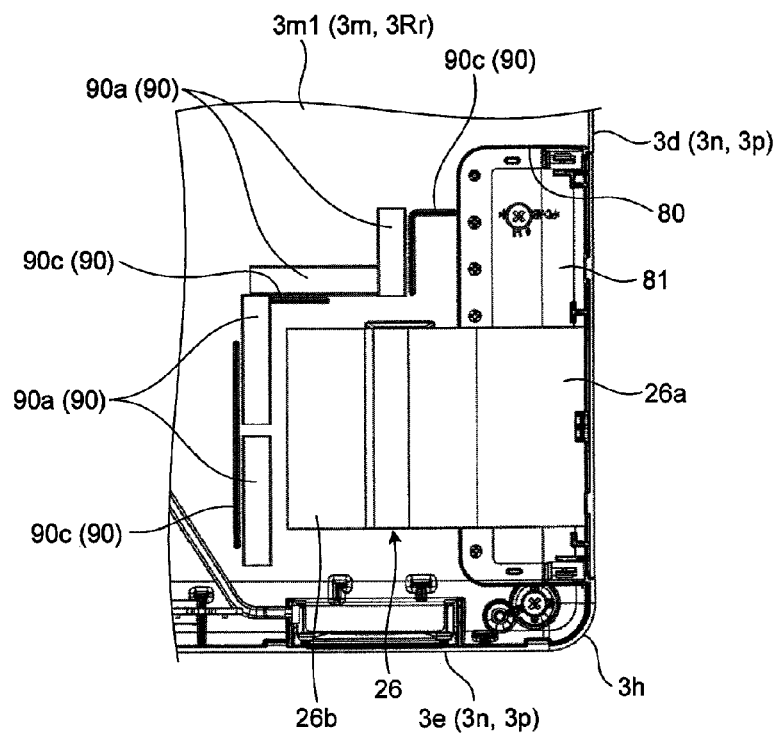
FIG. 3 is an exemplary front view of an internal configuration of a part of the television receiver in the first embodiment.

As illustrated in FIG. 1, the boards 6 and 7 are located relatively near the end 3c of the housing 3A. As illustrated in FIGS. 1 and 3, the housing 3A comprises therein an antenna 26. The antenna 26 is located relatively near the end 3e located on the side opposite the end 3c, and is also located relatively near the corner 3h as an end in the lengthwise direction of the end 3e. With such an arrangement, as an example, the boards 6 and 7, and the antenna 26 can be arranged more remote from each other. Consequently, as an example, it is easy to prevent noise caused by electromagnetic waves generated from electromagnetic wave generating components (such as the CPU and the memories, not shown) that are provided on the boards 6 and 7 from mixing into (overlapping, affecting, or adversely affecting) an electromagnetic wave (signal) transmitted with the antenna 26.

In the present embodiment, as an example, the antenna 26 is configured to have not only a rectangular shape (non-square rectangular shape as an example in the present embodiment) but also a plate shape (card shape, or film shape), as illustrated in FIG. 3. In the present embodiment, as an example, the antenna 26 comprises a communication portion 26a on one side in the longer side direction, and a ground portion 26b on the other side in the longer side direction.

In the present embodiment, as an example, the antenna 26 is provided on the wall 3m. Specifically, the ground portion 26b is fixed to a surface 3m1 (inner surface, or wall surface) of the wall 3m of the housing 3A. The wall 3m (second member 3Rr) is composed of an electrically conductive material (for example, metallic material such as magnesium alloy). The ground portion 26b is fixed to the wall 3m with an electrically conductive adhesive as an example, and is electrically connected to the wall 3m. Consequently, according to the present embodiment, as an example, a difference in electrical potential between the ground portion 26b and the wall 3m is likely to be small, and thus, noise is less likely to be mixed into the signal of the antenna 26.

Figure 4:
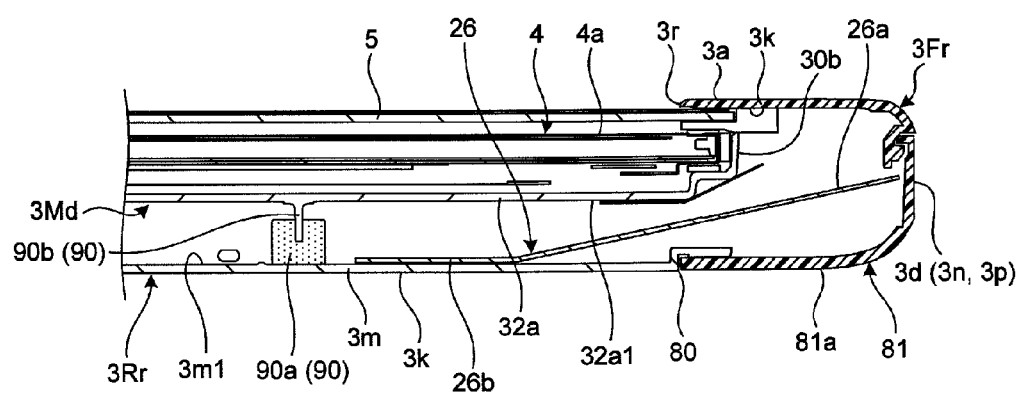
FIG. 4 is an exemplary cross sectional view taken along IV-IV in FIG. 1, in the first embodiment.

In the present embodiment, as an example, the wall 3m is provided with an opening 80, as illustrated in FIGS. 3 and 4. In the present embodiment, as an example, the opening 80 is provided as a rectangular cutout. The opening 80 is closed by being covered with a member 81. The member 81 is composed of a material (such as insulator, nonconductor, synthetic resin material, or plastic) with a lower electrical conductivity than that of the wall 3m. The member 81 is configured to have not only a plate shape (wall shape) but also a rectangular shape. An outer surface 81a of the member 81 constitutes a part of the rear surface 3b of the housing 3A. The member 81 constitutes a part of the end 3d (wall 3n, side surface 3p). The communication portion 26a has a portion that does not overlap the wall 3m in the front view (viewed in the thickness direction of the housing 3A), and overlaps the opening 80 and the member 81. At least a portion (in the present embodiment, the entire first member 3Fr as an example) of the wall 3k overlapping the opening 80 (member 81, communication portion 26a) is also composed of a material (such as insulator, nonconductor, synthetic resin material, or plastic) with a lower electrical conductivity than that of the wall 3m. The third member 3Md is composed of an electrically conductive material (for example, metallic material such as magnesium alloy). However, as illustrated in FIG. 4, at least a part of the communication portion 26a is located on the side of the end 3d relative to an end 30b serving as an end of the third member 3Md, and does not overlap the end 30b of the third member 3Md. Consequently, according to the present embodiment, as an example, it is easy to prevent communication characteristics of the antenna 26 from being impaired by the electrically conductive material (conductor).

In the present embodiment, as an example, the housing 3A comprises a shield 90 along at least a part of a periphery of the ground portion 26b of the antenna 26. The shield 90 is provided in a bridging manner between the wall 3m of the second member 3Rr and a wall 32a of the third member 3Md. Specifically, the shield 90 comprises: a member 90a provided on the surface 3m1 (inner surface, or wall surface) of the wall 3m; and a projection 90b (rib, or wall) projecting from a surface 32a1 (inner surface, or wall surface) of the wall 32a of the third member 3Md. In the present embodiment, as an example, the member 90a has an external appearance of a rectangular cuboid shape (prismatic shape) extending with a rectangular section. The member 90a has flexibility. The member 90a can comprise, for example, an internal member composed of foamed material or elastic material (such as sponge, rubber, or elastomer), and an external member (such as a cloth, a sheet, or a film) covering around the internal member. The external member can be composed of an electrically conductive material. The internal member can also be composed of an electrically conductive material. The member 90a is bonded (fixed, joined, or connected) to the wall 3m with an electrically conductive adhesive as an example. Consequently, the member 90a is electrically connected to the wall 3m, and also eventually electrically connected to the ground portion 26b. The projection 90b is provided so as to face (oppose) the member 90a, and is in contact with the member 90a in an assembled state. In the present embodiment, as an example, the projection 90b is buried in the member 90a. Consequently, the wall 32a is also electrically connected to the ground portion 26b via the projection 90b and the member 90a. In the present embodiment, as an example, the boards 6 and 7 are located between the wall 3m of the second member 3Rr and the wall 32a of the third member 3Md. The shield 90 is located between the antenna 26 (or the ground portion 26b of the antenna 26) and the boards 6 and 7, as can be understood from FIGS. 1 and 3. The wall 3m is an example of the first wall portion, and the wall 32a is an example of the second wall portion. The member 90a is an example of the first portion (first member), and the projection 90b is an example of the second portion (second member). Note that, in the present embodiment, the shield 90 comprises, as an example, a wall 90c projecting out from the surface 3m1 of the wall 3m. The wall 90c also has an electrical conductivity, and can bear a part of a shielding function. The wall 90c runs along the member 90a. Consequently, according to the present embodiment, as an example, the wall 90c can serve as a target, a guide, or a positioner for mounting the member 90a to the wall 3m. Also, according to the present embodiment, as an example, the wall 90c improves a stiffness of the wall 3m (second member 3Rr).

As described above, in the present embodiment, as an example, the antenna 26 is provided relatively near the corner 3h of the housing 3A. With this arrangement, as illustrated in FIG. 3, one side of the rectangular-shaped antenna 26 (ground portion 26b) can be placed along (opposing) the wall 3n (side wall) of the housing 3A. Consequently, by configuring this wall 3n with an electrically conductive member, the wall 3n located at the peripheral edge along this particular side can be used as a shield for the side. However, this wall 3n prevents electromagnetic waves coming from outside the housing 3A from mixing into the electromagnetic wave (signal) of the antenna 26.

As described above, in the present embodiment, the shield 90 is located between the antenna 26 and the boards 6 and 7. Consequently, according to the present embodiment, as an example, it is easy to prevent the electromagnetic waves coming from (components, electronic components, etc. provided on) the boards 6 and 7 from mixing into (overlapping, affecting, or adversely affecting) the electromagnetic wave (signal) of the antenna 26.

In the present embodiment, as an example, the shield 90 comprises the projection 90b projecting from the surface 32a1 of the wall 32a. In addition, in the present embodiment, as an example, the shield 90 comprises the member 90a that is bonded to the surface 3m1 of the wall 3m with the electrically conductive adhesive. Consequently, according to the present embodiment, as an example, the shield 90 can be obtained with a relatively simple configuration.

In the present embodiment, as an example, the boards 6 and 7 are located relatively near the end 3c of the housing 3A, and the antenna 26 is located relatively near the end 3e located on the side opposite the end 3c. In addition, in the present embodiment, as an example, the antenna 26 is located relatively near the corner 3h located at the end in the lengthwise direction of the end 3e. Consequently, according to the present embodiment, as an example, the boards 6 and 7, and the antenna 26 are arranged more remote from each other. As a result, as an example, it is far easier to prevent the electromagnetic waves coming from (components, electronic components, etc. provided on) the boards 6 and 7 from mixing into (overlapping, affecting, or adversely affecting) the electromagnetic wave (signal) of the antenna 26.

In the present embodiment, as an example, the shield 90 is provided in a bridging manner between the wall 3m and the wall 32a. In addition, in the present embodiment, as an example, the boards 6 and 7 are located between the wall 3m and the wall 32a. Consequently, according to the present embodiment, as an example, it is far easier to prevent the electromagnetic waves coming from (components, electronic components, etc. provided on) the boards 6 and 7 from mixing into (overlapping, affecting, or adversely affecting) the electromagnetic wave (signal) of the antenna 26.

In the present embodiment, as an example, the shield 90 comprises the flexible member 90a and the projection 90b abutting against the member 90a. Consequently, according to the present embodiment, as an example, gaps of the shield 90 are likely to be reduced. As a result, as an example, a shielding effect by the shield 90 is easily obtained in a more reliable manner.

In the present embodiment, as an example, the ground portion 26b has a portion overlapping the walls 3m and 32a, and the communication portion 26a has a portion not overlapping the walls 3m and 32a. In addition, in the present embodiment, as an example, the wall 3m is provided with the opening 80, and the opening 80 is covered with the member 81 that has a lower electrical conductivity than that of the wall 3m. Consequently, according to the present embodiment, as an example, it is easy to prevent the communication portion 26a from causing a communication failure by virtue of the walls 3m and 32a.

Figure 5:
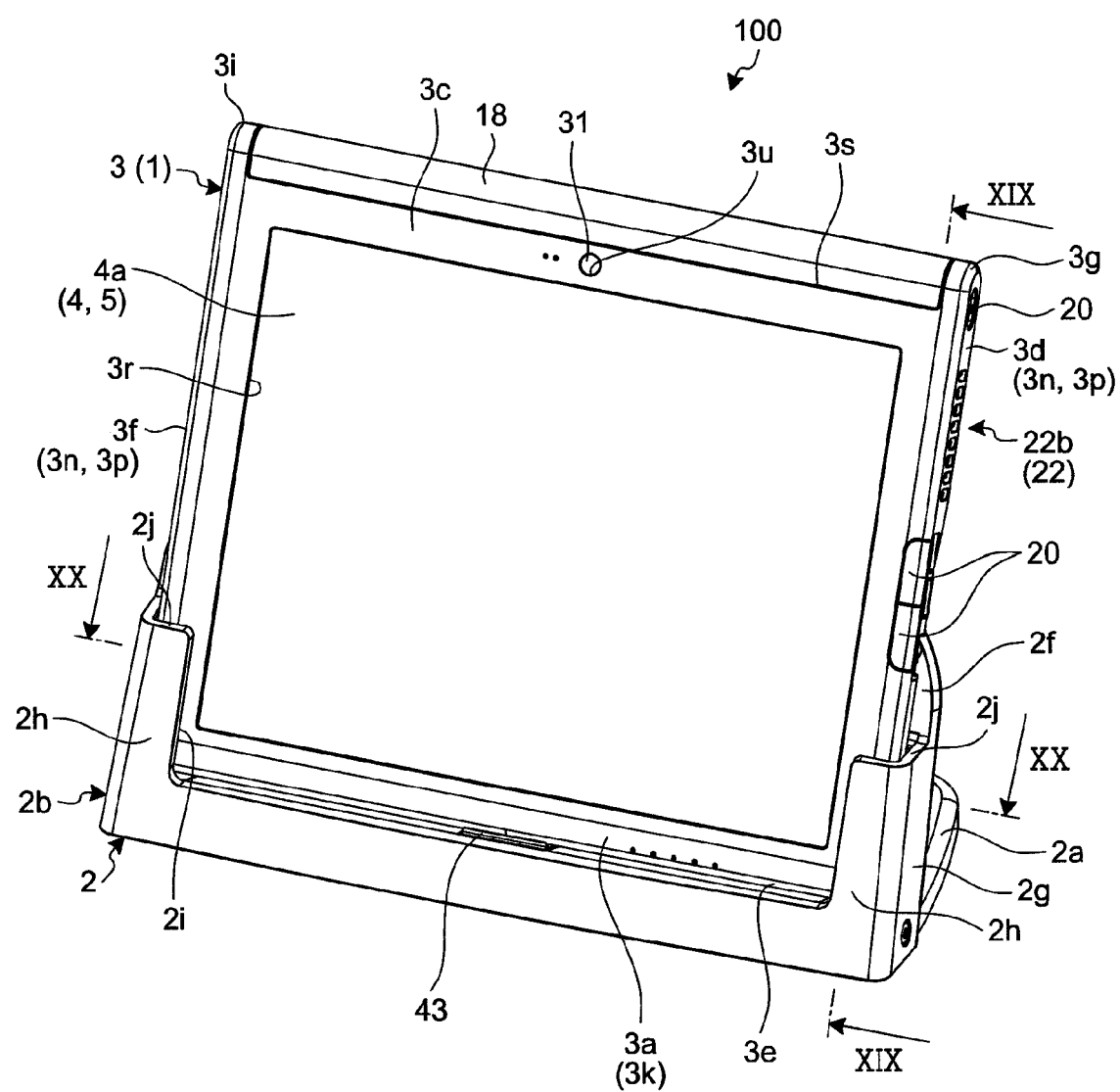
FIG. 5 is an exemplary perspective view illustrating a state in which a television receiver is held by a docking station, according to a second embodiment.

In a second embodiment, as an example, a television receiver 1 which is an example of an electronic device is mounted on a docking station 2 which is an example of a support, thus configuring a television system (electronic device system) 100, as illustrated in FIG. 5. In the present embodiment, when connected to the television receiver (electronic device) 1, the docking station 2 (support) can add functions that are not provided by the television receiver 1, or extend or enhance functions that are provided by the television receiver 1 in such a way, for example, that connectors for the television receiver 1, that is, connectors electrically connected to circuits or the like in the television receiver 1 are added, or the connectors are increased in number. That is, the docking station 2 (support) is an example of a function extending device corresponding to the television receiver (electronic device) 1.

The docking station 2 supports a housing 3 of the television receiver 1, where the housing 3 houses a display device 4. That is, the docking station 2 is an example of a support device (support platform, or stand) of the television receiver 1. The docking station 2 comprises a mechanism (not illustrated in FIG. 5) that can adjust an angle of a display screen 4a of the display device 4. That is, the docking station 2 is an example of an angle adjusting device for the display screen 4a (housing 3 housing the display device 4).

Figure 6:
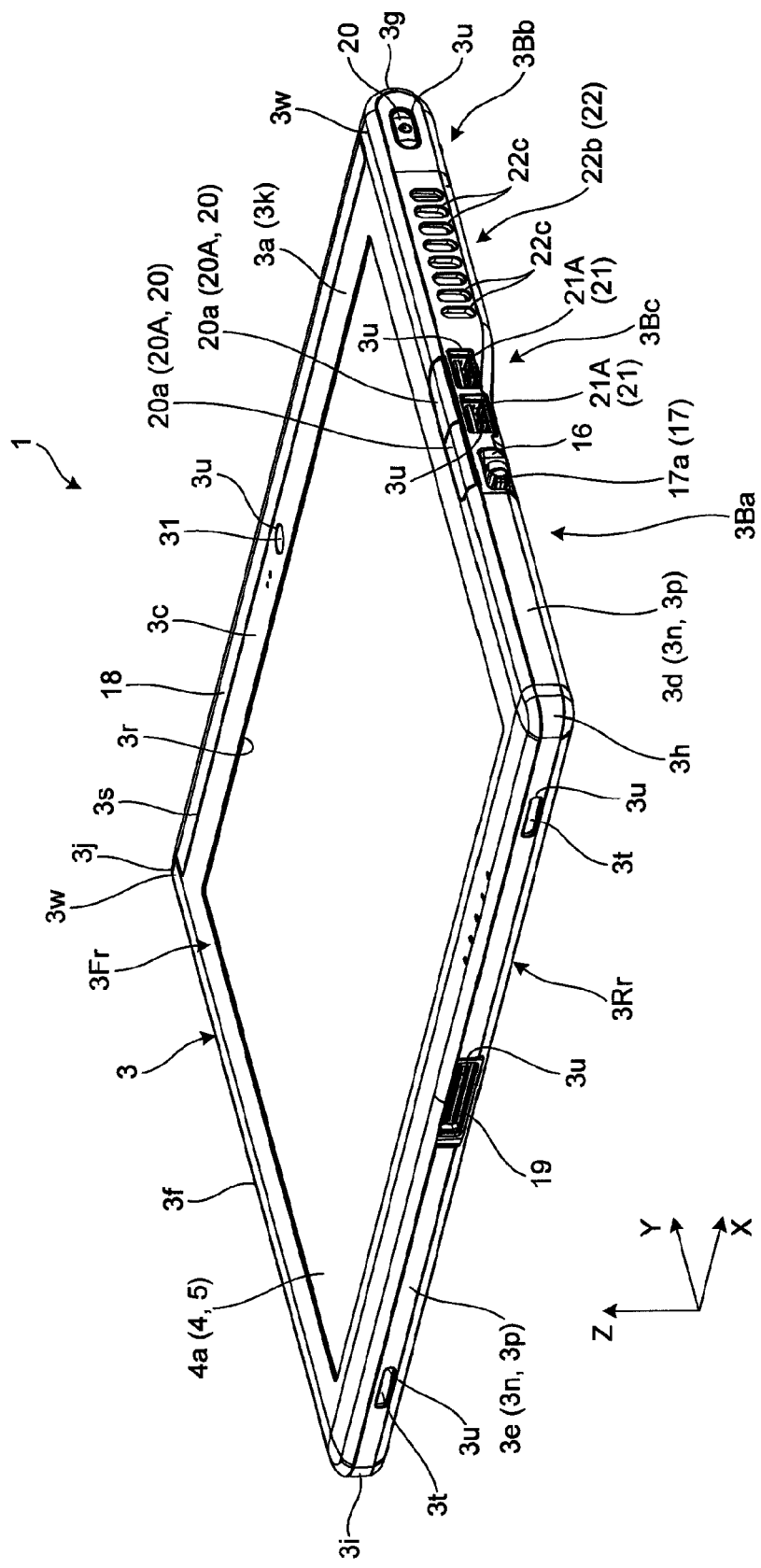
FIG. 6 is an exemplary perspective view of the television receiver in the second embodiment.
Figure 7:
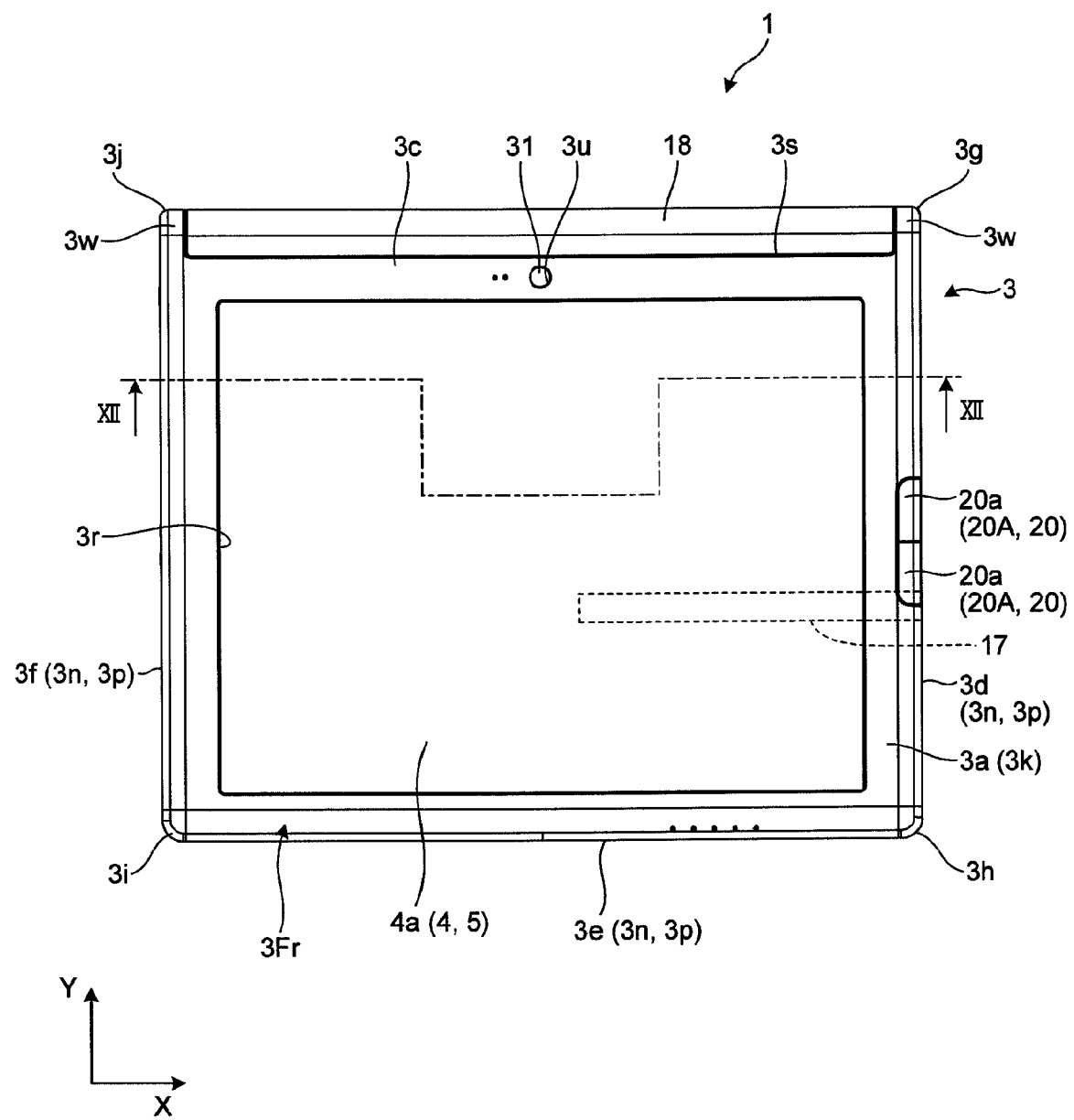
FIG. 7 is an exemplary front view of the television receiver in the second embodiment.
Figure 8:
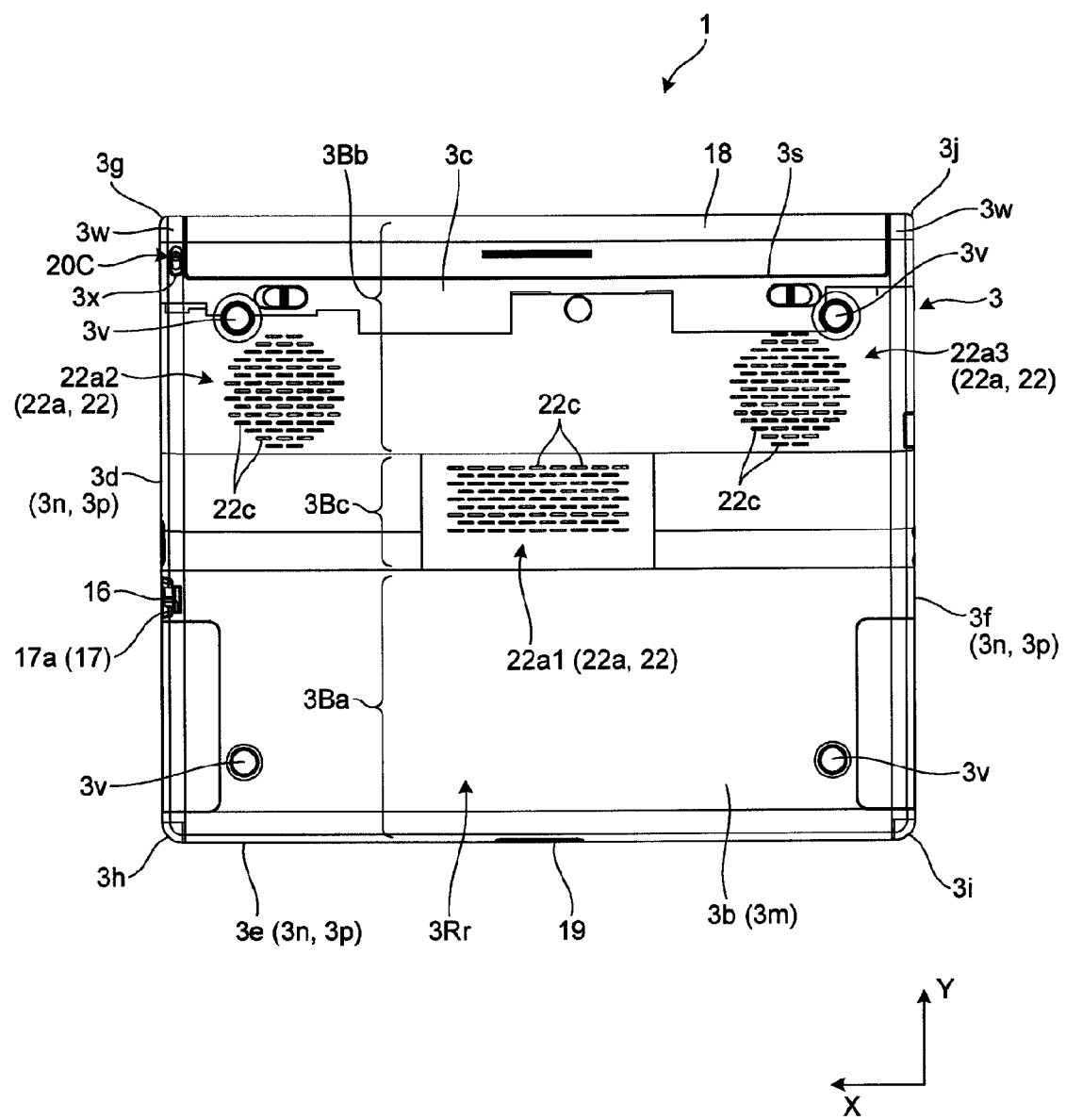
FIG. 8 is an exemplary rear view of the television receiver in the second embodiment.
Figure 9:
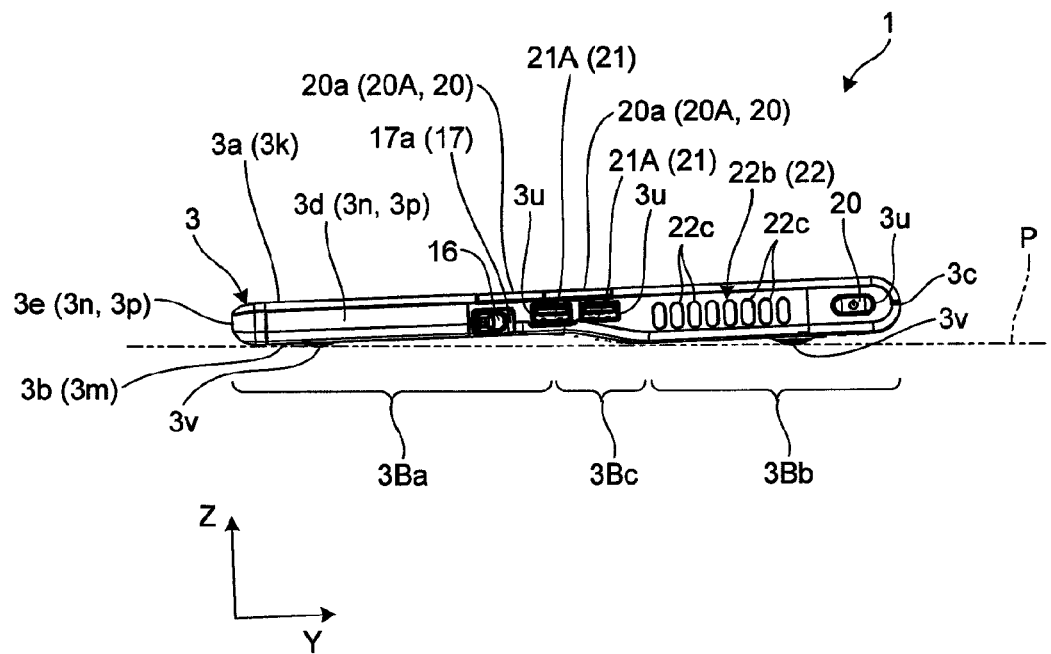
FIG. 9 is an exemplary side view of the television receiver in the second embodiment.

In the present embodiment, as an example, the housing 3 of the television receiver 1 is configured, as illustrated in FIGS. 5 to 8, to have a rectangular shape (non-square rectangular shape as an example in the present embodiment) in the front and rear views. In the present embodiment, as an example, the housing 3 is also configured, as illustrated in FIGS. 6 and 9, to have a flat rectangular cuboid shape that is thin in the front-rear direction. The housing 3 comprises a front surface (front, surface, first surface, or first surface portion) 3a and a rear surface (rear, surface, second surface, or second surface portion) 3b on the side opposite the front surface. The front surface 3a and the rear surface 3b are substantially in parallel with each other. The housing 3 also comprises, as illustrated in FIGS. 6 to 8, four ends (sides, or edges) 3c to 3f and four corners (apexes, curves, or ends) 3g to 3j in the front view. The ends 3c and 3e are examples of longer sides. The ends 3d and 3f are examples of shorter sides.

The housing 3 also comprises a wall (first wall portion, first portion, plate, frame, front wall, face wall, or top wall) 3k comprising the front surface 3a, and a wall (second wall portion, second portion, plate, rear wall, back wall, or bottom wall) 3m comprising the rear surface 3b. The walls 3k and 3m have each a rectangular shape (non-square rectangular shape as an example in the present embodiment). The housing 3 also comprises four walls (third wall portions, third portions, plates, side walls, end walls, standing walls, or bridging portion) 3n comprising each a side surface (surface, peripheral surface, or third surface) 3p provided in a bridging manner between the wall 3k and the wall 3m. The wall 3k is provided with an opening 3r having a rectangular shape as an example.

Figure 10:
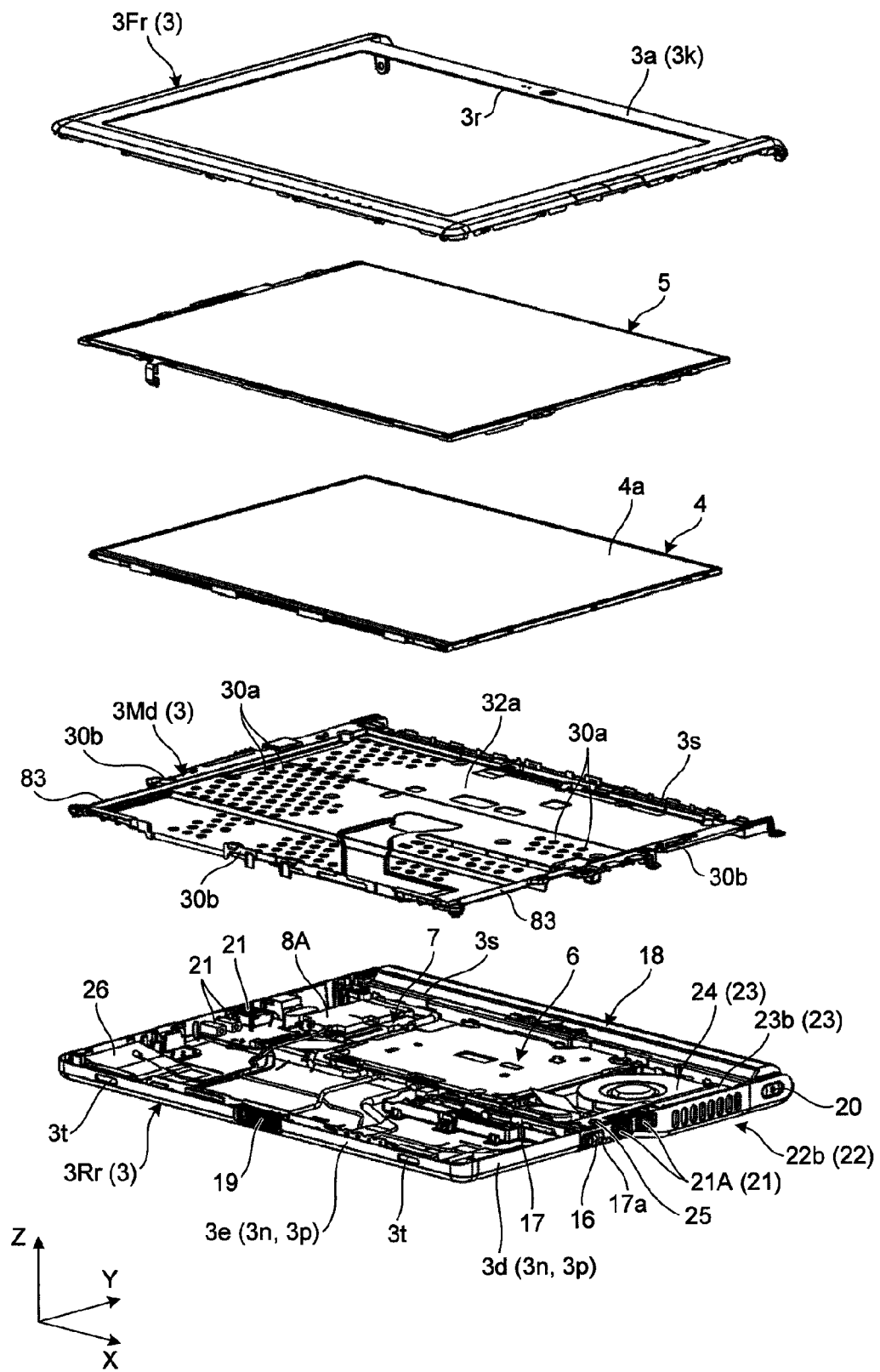
FIG. 10 is an exemplary exploded perspective view of the television receiver in the second embodiment.
Figure 12:
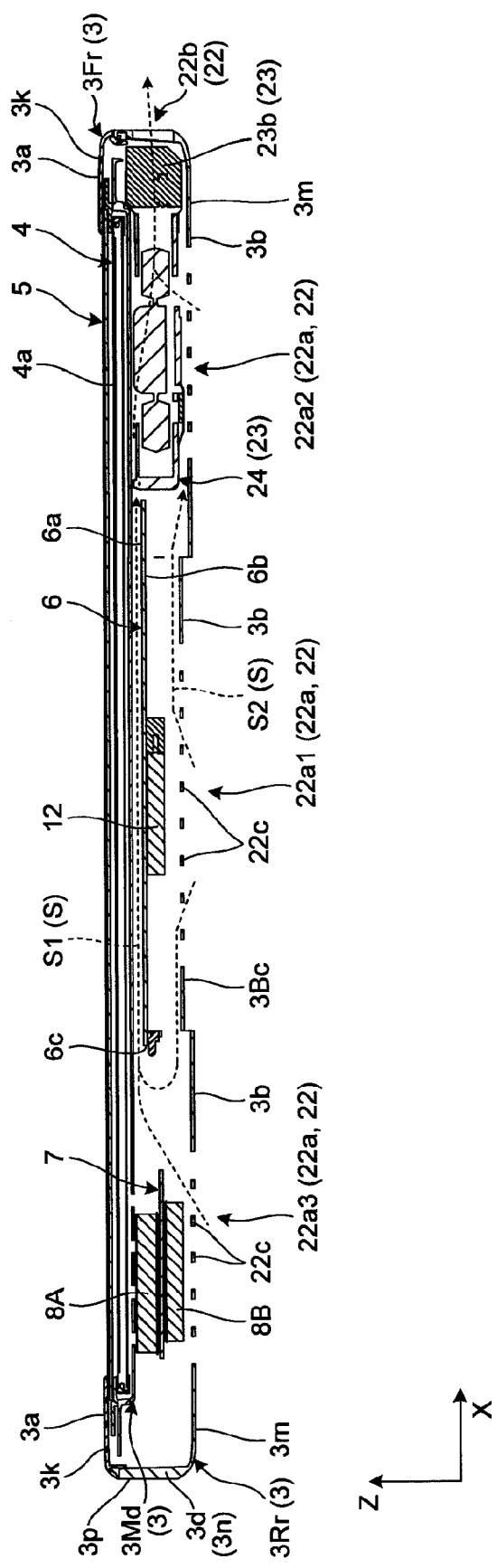
FIG. 12 is an exemplary cross sectional view taken along XII-XII in FIG. 7, in the second embodiment.

The housing 3 can be configured by combining a plurality of components (divided bodies). In the present embodiment, as an example, the housing 3 comprises a first member (first portion, front member, or cover) 3Fr that comprises at least the wall 3k, and a second member (second portion, rear member, base, or bottom) 3Rr that comprises at least the wall 3m. The walls 3n are comprised in at least one of the first member 3Fr and the second member 3Rr (for example, in the second member 3Rr). In the present embodiment, as illustrated in FIGS. 10 and 12, in addition to the first member 3Fr and the second member 3Rr, the housing 3 comprises a third member (third portion, intermediate member, dividing member, barrier member, wall member, interposed member, inner plate, middle plate, or middle frame) 3Md that is located between the first and the second members. A part of the walls 3n can be comprised in the third member 3Md. The housing 3 can be composed of, for example, metallic material or synthetic resin material. As an example, the second member 3Rr and the third member 3Md can be composed of a relatively high-stiffness material (for example, metallic material such as magnesium alloy), and the first member 3Fr can be composed of a relatively low-stiffness material (material, such as synthetic resin material, having a lower stiffness than that of the second member 3Rr and the third member 3Md). Note that the first member 3Fr, the second member 3Rr, and the third member 3Md can comprise walls (projections, or projecting walls) such as ribs. The walls are likely to increase the stiffness of the housing 3. The third member 3Md can also be provided with openings 30a such as through-holes. The housing 3 can be configured to be lighter in weight by the openings 30a.

In the present embodiment, as an example, as illustrated in FIG. 9, a first portion 3Ba located on the lower side or front side (near side to the user) in the state in which the television receiver 1 is used with the longer side thereof oriented sideways has a thickness smaller than that of a second portion 3Bb located on the upper side or rear side (far side from the user) in the same state. Therefore, in the state in which the television receiver 1 is used while being placed on a placing surface P such as a desk, the front surface 3a of the housing 3 and the display screen 4a (refer to FIG. 6) increase in height from the placing surface (horizontal surface) P as a position thereof changes from the front side (lower side) to the rear side (upper side). Consequently, according to the present embodiment, as an example, there is an advantage that the display screen 4a is placed in a so-called tilted state for the user positioned on the left side of FIG. 9 relative to the television receiver 1, and thus, the user can easily view the display screen 4a. In the state of FIG. 9, the display screen 4a and the placing surface P can form an angle (on the obtuse angle side) of 135° or more and less than 180°. In the present embodiment, as an example, the rear surface 3b of the housing 3 comprises a plurality of projections 3v (3v, 3v). As is demonstrated by FIG. 9, the distance between a tip portion of the projection 3v located at the second portion 3Bb on the right side of FIG. 9 and the display screen 4a is greater than the distance between a tip portion of the projection 3v located at the first portion 3Ba on the left side of FIG. 9 and the display screen 4a. In the present embodiment, (the tip portion of) the projection 3v on the left side of FIG. 9 is an example of a first contact portion, and (the tip portion of) the projection 3v on the right side of FIG. 9 is an example of a second contact portion.

The housing 3 comprises a component housing 17 that houses a component 16 in a removable manner. In the present embodiment, as an example, an opening 17a of the component housing 17 opens at the end 3d. The opening 17a is provided in the end 3d which is located on the upper side in some in-use attitude (in the above-described example, a first attitude or a second attitude), and which is not located on the lower side in a non-use attitude. With such a configuration, the opening 17a is located on the upper side in an in-use attitude. Consequently, as an example, it is easy to prevent the component 16 from coming off from the component housing 17 by an action of gravity. Specifically, the component 16 is, for example, a stylus, a stylus pen, or a pen.

In the present embodiment, as an example, as illustrated in FIG. 7, a battery 18 and the display device 4 are arranged side by side in a direction perpendicular to the thickness direction of the housing 3 (in a direction along the front surface 3a or the rear surface 3b, that is, in the X or Y direction; in the present embodiment, as an example, in the Y direction) without overlapping each other in the thickness direction. Consequently, as an example, the housing 3 can be configured to be thinner than in the case in which the battery 18 and the display device 4 overlap each other in the thickness direction of the housing 3. Alternatively, as an example, compared with the case in which the battery 18 and the display device 4 overlap each other in the thickness direction of the housing 3, the battery 18 can easily be thicker, and consequently, a capacity per unit volume of the battery 18 can easily be increased. As illustrated in FIG. 9, in the present embodiment, the housing 3 comprises the thin first portion 3Ba and the thick second portion 3Bb. A battery housing (battery support) 3s housing the battery 18 is provided at the end 3c of the thick second portion 3Bb. Therefore, as an example, compared with the case in which the battery housing 3s is provided at the first portion 3Ba, the battery can easily be thick, and consequently, a charging capacity per unit volume of the battery 18 can easily be increased.

In the present embodiment, as an example, the end 3e opposite the end 3c provided with the battery housing 3s is supported by the docking station 2. Consequently, as an example, the operator (such as the user) can mount and remove the battery 18 to and from the housing 3 in the state in which the television receiver 1 is supported by the docking station 2. The end 3e comprises, as illustrated in FIGS. 6 and 7, a connector 19 that is connected to a connector 43 (refer to, for example, FIG. 17) of the docking station 2. Consequently, as an example, the battery housing 3s and the connector 19 can easily be provided at the housing 3 without interfering each other. Speaker covers 3t are exposed at the end 3e. The connector 19 and the speaker covers 3t are exposed via openings 3u provided in the wall 3n at the end 3e. The connector 19 is an example of a first connector.

In the present embodiment, as an example, as illustrated in FIGS. 5, 6, 7, and 9, the front surface 3a and the side surfaces 3p of the housing 3 comprise operation modules 20 and connectors 21. The operation modules 20 can be, for example, push buttons, push switches, slide switches, and pointing devices. The connectors 21 are, for example, a connector for a power cable, USB connectors, connectors for an earphone and a microphone. The operation modules 20 and the connectors 21 are exposed via the openings 3u provided in the walls 3k and 3n of the housing 3. The front surface 3a can comprise a camera (camera module, or image-taking device) 31.

Figure 11:
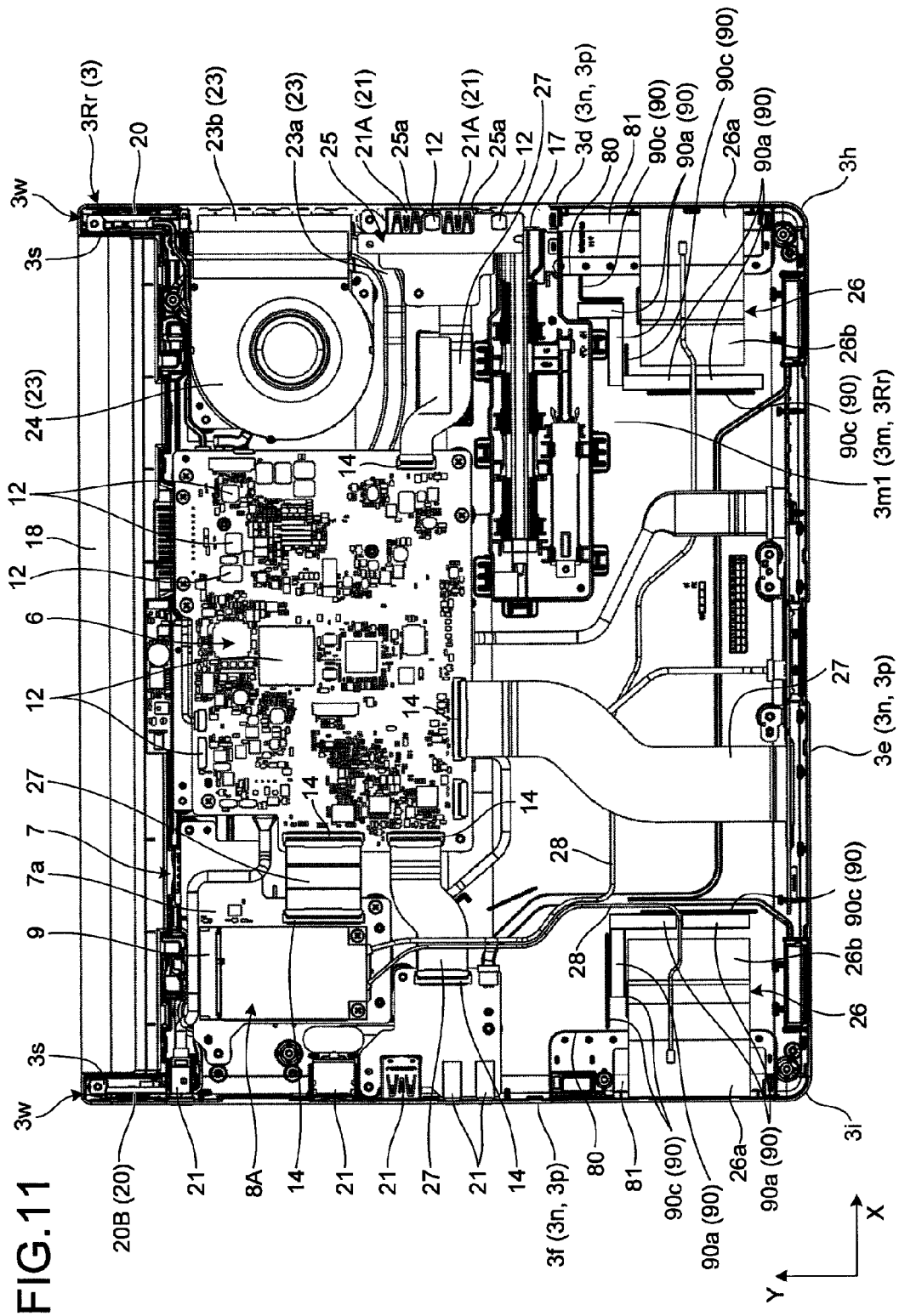
FIG. 11 is an exemplary plan view of an internal configuration of the television receiver in the second embodiment.

In the present embodiment, as an example, as illustrated in FIGS. 6, 8, and 9, the rear surface 3b and the side surface 3p of the housing 3 is provided with vent holes 22 that introduce or exhaust air used for, for example, cooling electronic components 12 (refer to FIGS. 11 and 12). In the present embodiment, as an example, the rear surface 3b (wall 3m) is provided with introduction ports 22a that introduce air, and the side surface 3p (wall 3n, end 3d) is provided with an exhaust port 22b that exhausts air. In the present embodiment, the introduction ports 22a and the exhaust port 22b are provided as portions in which a plurality of small openings 22c provided in the walls 3m and 3n are grouped together. Note that the rear surface 3b comprises the projections 3v. Therefore, the introduction ports 22a are not closed even in the state in which the rear surface 3b is placed on the placing surface P, as illustrated in FIG. 9. In the present embodiment, a boundary portion between the thin first portion 3Ba and the thick second portion 3Bb of the housing 3 comprises a slope portion 3Bc. In addition, as illustrated in FIG. 8, one introduction port 22a1 of the introduction ports 22a is provided at the rear surface 3b at the slope portion 3Bc. As illustrated in FIG. 9, the distance between the slope portion 3Bc and the placing surface P is greater than the distance between the other portions and the placing surface P. Therefore, the introduction port 22a1 provided at the slope portion 3Bc can easily have the reduced air-flow resistance, and thus, the cooling efficiency can easily be increased. Moreover, in the present embodiment, the introduction ports 22a are provided in plurality. Therefore, as an example, even if one of the introduction ports 22a is closed due to some cause, the other introduction ports 22a can introduce air flows into the housing 3, and thus, the cooling performance is hardly impaired. The inside of the housing 3 may be cooled by a cooling mechanism 23 (refer to FIGS. 11 and 12), or by natural cooling (convection cooling).

In the present embodiment, as an example, as illustrated in FIGS. 10 and 12, the display device (display module, display, or panel) 4 is housed between the first member 3Fr and the third member 3Md. The display screen 4a located on the side of the front surface 3a relative to the display device 4 is exposed in front (outside) of the housing 3 via the opening 3r. Thus, the user can view the display screen 4a from the front side through the opening 3r. The display device 4 is configured to have a rectangular shape (non-square rectangular shape as an example in the present embodiment) in the front view. The display device 4 is also configured to have a flat rectangular cuboid shape that is thin in the front-rear direction. The display device 4 is, for example, a liquid crystal display (LCD) or an organic electro-luminescent display (OELD).

In the present embodiment, as an example, the display device 4 comprises, in front (on the face side, or on the side of the wall 3k) thereof, a transparent input operation panel (touchscreen, touch sensor, or operation surface as an example) 5 with a relatively thin rectangular shape. The input operation panel 5 covers the display screen 4a. The operator (such as the user) can execute input processing by performing operation such as touching, pressing, or dragging the input operation panel 5 with, for example, a finger or the component 16 (stylus), or moving the finger or the stylus near the input operation panel 5. Light emitted from the display screen 4a of the display device 4 travels out from the opening 3r of the wall 3k to the front (outside) of the housing 3 through the input operation panel 5. The input operation panel 5 is an example of an input module.

In the present embodiment, as an example, as illustrated in FIG. 10, a plurality of boards 6, 7, and 25 are housed at the rear (on the back side, on the side behind, on the side of the wall 3m, or on the side opposite the display screen 4a) of the display device 4 (in the present embodiment, as an example, between the second member 3Rr and the third member 3Md) in the housing 3. The boards 6, 7, and 25 are located at different position. All of the boards are provided in parallel with the display device 4. The boards 6, 7, and 25 are also provided in a state separated from the walls 3k, 3m, and 3n, that is, in the state in which spaces are provided between themselves and the walls 3k, 3m, and 3n. The boards 6, 7, and 25 are arranged along the display device 4, and can be arranged so as not to overlap each other in the thickness direction of the housing 3. The boards 6, 7, and 25 are fixed to the housing 3 by fixing devices such as screws.

In the present embodiment, as an example, the board (first board, first circuit board, control board, or main board) 6 can be mounted with the plurality of electronic components 12 (refer to FIGS. 11 and 12, of which FIG. 12 illustrates only a part), such as a central processing unit (CPU), a graphic controller, power supply circuit components, a platform controller hub (PCH), a memory slot connector, an liquid crystal display (LCD), an input/output (I/O) connector, a power coil, devices, and connectors. The electronic components 12 comprise heat generating bodies. The electronic components (heat generating bodies) 12 generating a large amount of heat can comprise the cooling mechanism 23. The cooling mechanism 23 comprises, for example, a heat sink (heat receiver not illustrated), a heat pipe 23a, a heat dissipator 23b, and a fan 24. At least a part of a control circuit not illustrated is composed of the board 6 and the electronic components 12. The control circuit can comprise, for example, a video signal processing circuit, a tuner module, an HDMI signal processor, an AV input terminal, a remote-control signal receiver, a controller, a selector, an on-screen display interface, memories (such as a ROM, a RAM, an HDD, and a solid state drive (SSD)), and an audio signal processing circuit. The control circuit controls, for example, output of images (such as an animation and a still image) on the display screen 4a of the display device 4, output of sound from speakers (not shown), and emission of light from LEDs not illustrated. The display device 4, the speakers, and the LEDs are examples of output modules.

As can be understood from FIGS. 9 and 11, in the present embodiment, as an example, the boards 6 and 7, and the cooling mechanism 23 are located at the thick second portion 3Bb of the housing 3. Consequently, as an example, compared with the case in which the boards 6 and 7, and the cooling mechanism 23 are located at the thin first portion 3Ba, a larger space can be ensured, and thus, it is easier to obtain a cooling effect by air flows generated by the fan 24 of the cooling mechanism 23. In the present embodiment, as an example, the fan 24 and the heat dissipator 23b are provided at the corner 3g where the end 3d is connected to the end 3c that is located on the upper side in the specified (controlled) in-use state. Therefore, as an example, the fan 24 and the heat dissipator 23b can be arranged on the upper side in the housing 3 regardless of the in-use attitude of the television receiver 1. Consequently, as an example, heat hardly accumulates in the housing 3. Note that the fan 24 and the heat dissipator 23b are provided adjacent to the exhaust port 22b.

In the present embodiment, as an example, the board 7 is provided at a location where the board 6 is interposed between the board 7 and the cooling mechanism 23 (at a location where the board 7, the board 6, and the cooling mechanism 23 are disposed in this order in the second portion 3Bb). With such a configuration, the air drawn from outside hits the board 7 before reaching the position of the board 6. Consequently, as an example, the board 7 is likely to have high heat radiation efficiency. The board 7 mounted with modules 8A and 8B is located on the side opposite the cooling mechanism 23 which is another heavy object, relative to the board 6 which has a relatively large weight among components in the housing 3 and which is located in the middle of the housing 3. Therefore, as an example, the television receiver 1 has a better weight balance. Consequently, as an example, the user can hold the television receiver 1 more easily when carrying it.

In the present embodiment, as an example, as illustrated in FIG. 12, the wall 3m of the housing 3 is provided with an introduction port 22a2 near the fan 24, an introduction port 22a3 located on the side opposite to the introduction port 22a2 with the board 6 interposed therebetween, and the introduction port 22a1 that is located nearer to the electronic components 12 as heat generating bodies than are the introduction ports 22a2 and 22a3. Because the introduction port 22a2 is provided, air flows can be generated more efficiently in the housing 3. An air flow S introduced from the introduction port 22a3 is divided into an air flow S2 that flows along a second surface 6b at the rear of the board 6 toward the fan 24, and an air flow S1 that passes through (wraps around, or detours around) the outside of an end 6c located on the side opposite to the fan 24 relative to the board 6 and flows along a first surface 6a in front of the board 6 toward the fan 24. Consequently, the electronic components (heat generating bodies) 12 provided on both side of the first surface 6a and the second surface 6b of the board 6 can be cooled.

In the present embodiment, as an example, as illustrated in FIGS. 11 and 12, the board 7 and the modules 8A and 8B are arranged along the display device 4. The board 25 is provided with the electronic components 12. The housing 3 houses flexible cables 27. The flexible cables 27 electrically connect the boards 6, 7, and 25, the display device 4, and the connector 19 to each other. The flexible cables 27 are, for example, flexible printed wiring boards and flat cables.

As illustrated in FIG. 11, the housing 3 houses a plurality of antennas 26. In the present embodiment, the antennas 26 connected to one communication portion (for example, the module 8B) are arranged in a mutually spaced manner. In the present embodiment, as an example, one of the antennas 26 is arranged near the end 3d and the end 3e (near the corner 3h) of the housing 3 while the other of the antennas 26 is arranged near the end 3e and the end 3f (near the corner 3i) of the housing 3. With this arrangement, as an example, a spatial diversity of the antennas 26 can be formed. The antennas 26 are electrically connected to the module 8B via cables 28. Note that the antennas 26, 26 can be used for separate functions. For example, one of the antennas 26 can be used for send and receive while the other of the antennas 26 can be used for receive only, or one of the antennas 26 can be used as a backup for the other of the antennas 26.

Figure 13:
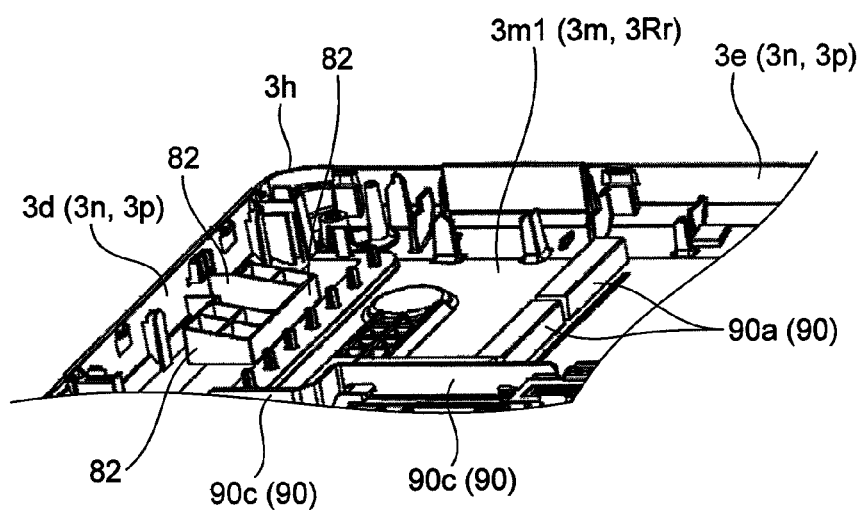
FIG. 13 is an exemplary perspective view of a part of a second member of the television receiver in the second embodiment.

The configurations of the antennas 26, a shield 90, and the walls 3m, 32a, and 3k are the same as those of the first embodiment described above. Consequently, with the present embodiment as well, the same effects as those of the first embodiment are obtained. That is, it is easy to prevent the electromagnetic waves coming from components (sources of the electromagnetic waves, electronic components 12, etc.)

from mixing into the electromagnetic waves (signals) of the antennas 26. In the present embodiment, as an example, the wall 3m is provided with a support 82 that supports the antenna 26, as illustrated in FIG. 13. In the present embodiment, as an example, the support 82 is configured as projections (walls, or ribs) projecting from the wall 3m. According to the present embodiment, as an example, the antenna 26 (communication portion 26a) can easily be supported more tightly by the support 82. In addition, the antenna 26 (communication portion 26a) can easily be held in a more suitable attitude.

Figure 14:
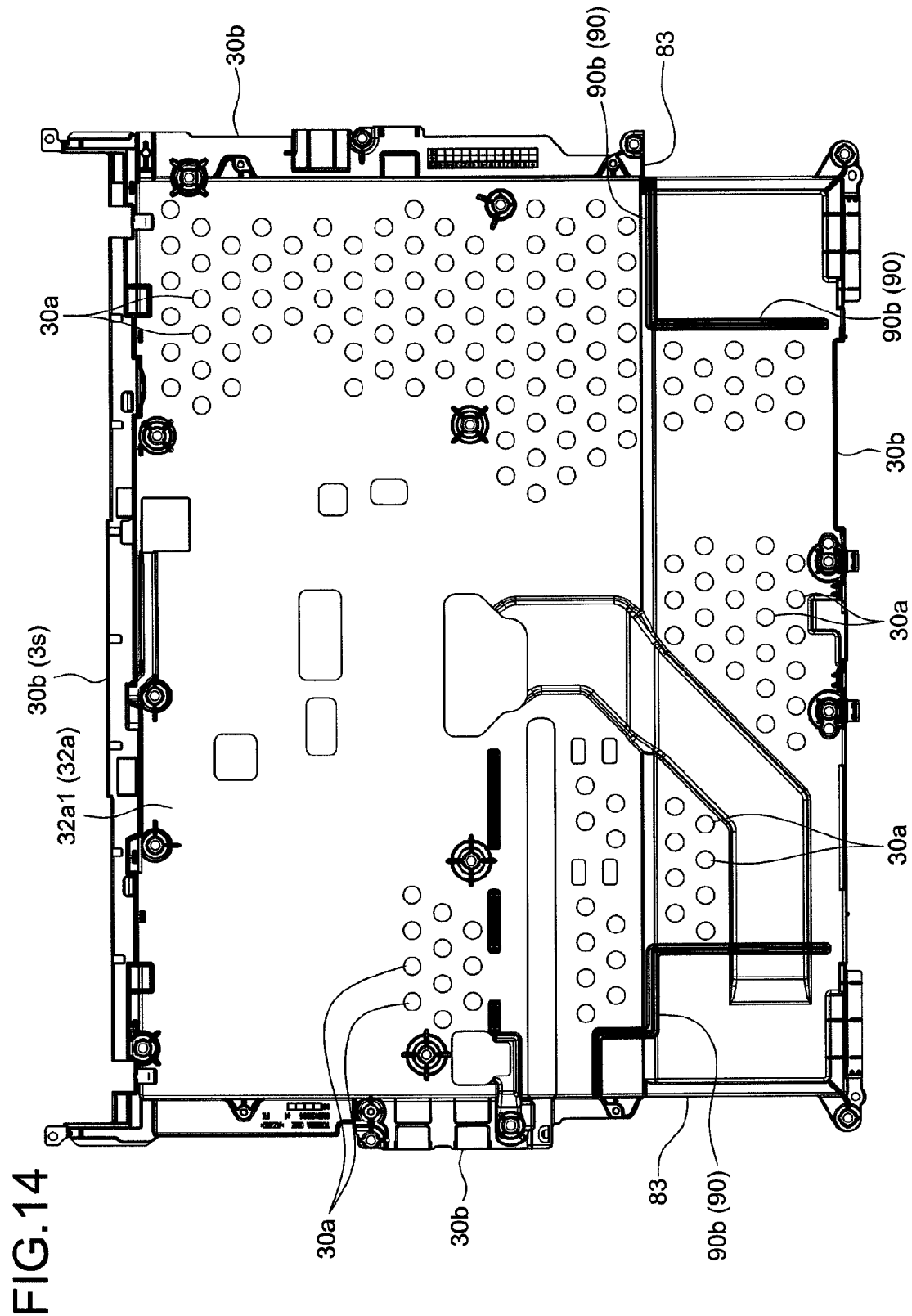
FIG. 14 is an exemplary plan view of a third member of the television receiver in the second embodiment.

As illustrated in FIG. 14, a surface 32a1 of the wall 32a of the third member 3Md is provided with projections 90b at locations corresponding (opposed) to members 90a. Ends 30b of the third member 3Md are provided with openings 83. In the present embodiment, as an example, the openings 83 are configured as cutouts. The openings 83 correspond to openings 80 provided at the wall 3m of the second member 3Rr, and overlap the openings 80 in the thickness direction of the housing 3. Consequently, jamming of the communication through the communication portion 26a of the antenna 26 is by the wall 3m can easily be suppressed.

Figure 15:
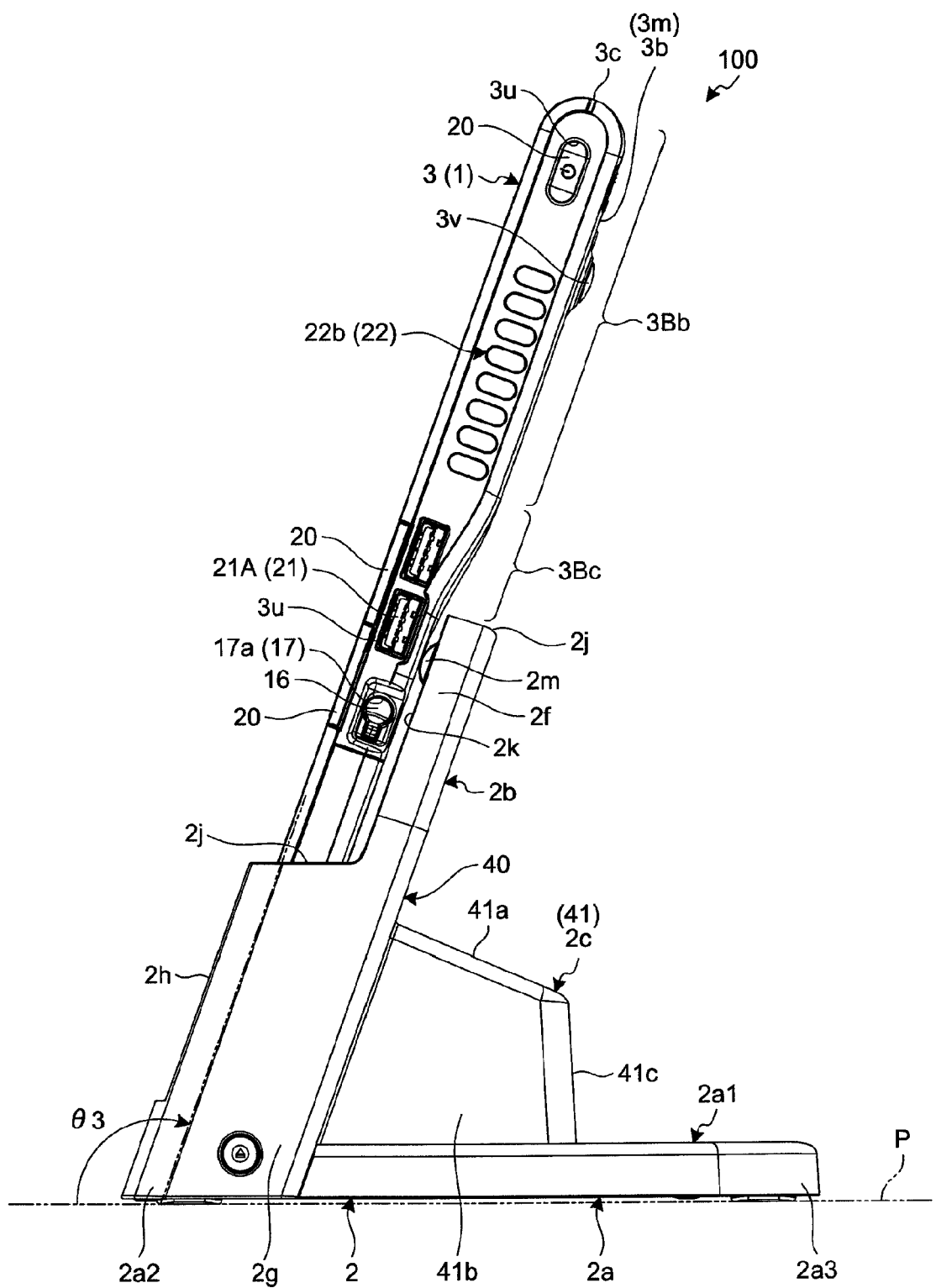
FIG. 15 is an exemplary side view illustrating the state in which the television receiver is held by the docking station in the second embodiment.

In the present embodiment, as an example, the docking station 2 comprises a first support 2a and a second support 2b, as illustrated in FIG. 15. The first support 2a is placed on the placing surface P, and serves as a foundation (platform, bottom, lower portion, ground, base, base portion, placing portion, leg portion, leg, tipping suppression portion, or suppression portion). The second support 2b projects from (a bottom of) the first support 2a to above the placing surface P, and holds the housing 3 of the television receiver 1 in a predetermined attitude (position). That is, the second support 2b serves as a holder (stand, vertical portion, upper portion, receiving portion, holding portion, cover, abutment, contact portion, or guide). Note that the first support 2a and the second support 2b need not be distinctly divided into components, but may be, for example, portions of a component. In the present embodiment, as an example, the docking station 2 also comprises a projection 2c that is located between the first support 2a and the second support 2b and that projects toward above the first support 2a and behind the second support 2b. The projection 2c has a function as a component housing 41 that houses components, and is interposed between the first support 2a and the second support 2b so as to serve as a support supporting the second support 2b. The docking station 2, the first support 2a, the second support 2b, and the projection 2c are an example of the support that supports the television receiver (electronic device) 1. The first support 2a, the second support 2b, and the projection 2c can be embodied in various specifications (such as shapes, structures, and numbers). The docking station 2 is connected mechanically and electrically to the television receiver (electronic device) 1 located in a predetermined position (mounting position, holding position, or placing position) of the docking station 2.

The docking station 2 can provide various functions related to the television receiver (electronic device) 1 mounted thereon. The docking station 2 can serve, for example, as a stand for standing the display screen 4a. In that case, the docking station 2 can have a function to variably set the angle of the display screen 4a (attitude of the television receiver 1). This function will be described later. The docking station 2 can also serve, for example, as a battery charger for the television receiver 1. In that case, the docking station 2 can serve either as a wired battery charger that is electrically connected to the television receiver 1, or as a battery charger that performs contactless charging (wireless power supply). In that case, a contactless charger is provided in the second support 2b, as an example. The docking station 2 can also serve, for example, as a connector module (hub for connectors, and/or relay device for data and signals) that increases the number of connectors electrically connected to the television receiver 1. The docking station 2 can also serve, for example, as a speaker of the television receiver 1. The docking station 2 can also be provided with, for example, a function for cooling the television receiver 1. In that case, as an example, a ventilation passage and a fan are provided in a housing 40 of the docking station 2, and thus, air passing through the ventilation passage can assist or facilitate the cooling of the television receiver 1. The ventilation passage can have an opening facing the vent holes 22 of the television receiver 1. As an example, the docking station 2 may comprise a cooler facing the television receiver 1. The docking station 2 can also be provided with, for example, a function as an AC adapter.

In the present embodiment, as an example, the docking station 2 has at least partially a hollow structure. The docking station 2 comprises the housing 40, which houses at least some of various components, such as boards not illustrated, connectors 43 and 44, electronic components not illustrated, and wire harnesses not illustrated. The housing 40 can be composed of synthetic resin material or metallic material (synthetic resin material as an example in the present embodiment). In the present embodiment, as an example, the housing 40 is provided therein with a frame (frame member, framework member, high-stiffness member, stiffness member, or strength member; not illustrated). The frame can be composed of metallic material or synthetic resin material (metallic material as an example in the present embodiment). The connector 43 is an example of a second connector. In the present embodiment, as an example, a board not illustrated as well as the connectors 44 and electronic components not illustrated provided on the board are housed in the component housing 41 that is a part of the housing 40 and is configured as the projection 2c.

In the present embodiment, as an example, as illustrated in FIGS. 15 to 18, the first support 2a is configured to have a flat shape (plate shape, or wall shape) along the placing surface P, having an external appearance that is thin in a side view along the placing surface P (as viewed as illustrated in FIG. 15) and is rectangular (trapezoidal) in a plan view as viewed perpendicularly to the placing surface P. In the present embodiment, as an example, the second support 2b projects from an end 2a2 of the first support 2a in a direction slightly tilted rearward (toward the rear in the state in which the television receiver 1 is mounted, or toward an end 2a3 on the opposite side of the end 2a2) from the vertical. As illustrated in FIGS. 15 to 20, the second support 2b holds (supports, bears, or sustains) a part of an end (the end 3e as an example in the present embodiment) of the housing 3 of the television receiver 1 in a surrounding (covering) manner from directions except a direction (the upside as an example in the present embodiment) in which the television receiver 1 is mounted (inserted) into the predetermined position (holding position, or holding region), that is, from the downside, the rear side, the lateral sides (left side and right side), and the front side. The second support 2b can also cover a portion along the end 3e (refer to FIG. 7). The second support 2b also serves as a guide that guides the housing 3 of the television receiver 1 into the predetermined position when the television receiver 1 moves (slides, is displaced, is inserted, or is mounted) toward the predetermined position. That is, the second support 2b is an example of a guide (guide portion, slide, or slide portion). In the present embodiment, as an example, the second support 2b comprises walls 2e to 2h. The wall (first wall, first wall portion, bottom wall, or lower wall) 2e is located below the housing 3 held in the predetermined position, and covers the housing 3 from below. The wall (second wall, second wall portion, rear wall, or back wall) 2f is located behind the housing 3, and covers the housing 3 from behind (rear side, rear surface side, back surface side, or side behind). The wall (third wall, third wall portion, or side wall) 2g is located lateral to the housing 3, and covers the housing 3 from the lateral side. The wall (fourth wall, fourth wall portion, or front wall) 2h is located in front of the housing 3, and covers the housing 3 from the front. Note that the wall 2e can be configured as a part of the first support 2a.

Figure 17:
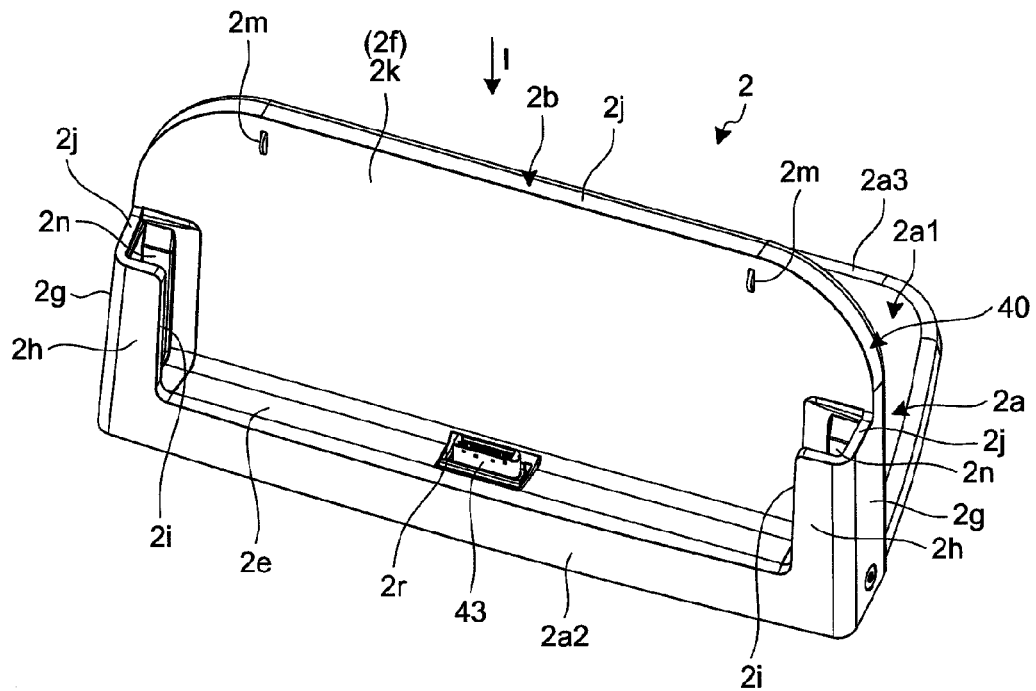
FIG. 17 is an exemplary perspective view of the docking station, as viewed form the upper side thereof, in the second embodiment.

In the present embodiment, as an example, the docking station 2 covers the television receiver 1 in the state in which a functional portion of the television receiver (electronic device) 1 is exposed, or in the state in which the functional portion is in communication with the surrounding area of the docking station 2. As an example, in the present embodiment, as illustrated in FIGS. 5 and 17, the second support 2b is provided with an opening 2i corresponding to the front of the television receiver 1. The opening 2i can be provided, for example, as a cutout or a through-hole (cutout as an example in the present embodiment). That is, in the present embodiment, when the television receiver 1 is in the attitude of being mounted on the docking station 2, if portions of the front surface 3a of the housing 3 along the ends 3d and 3f located on both the right and left sides are outside of the display screen 4a and the opening 3r, the portions are covered by (the wall 2h of) the second support 2b. With such a configuration, as an example, visibility of the display screen 4a can easily be ensured. Note that the television receiver 1 may be covered by a member (such as the second support 2b, the first support 2a, a part of the housing 40, or a member other than the housing 40) covering the end 3e located below the front surface 3a of the housing 3.

In the present embodiment, as an example, the docking station 2 holds the television receiver 1 in the state in which the vent holes 22 provided at the housing 3 of the television receiver 1 are exposed. As can be understood from FIGS. 16, 8, and 9, the vent holes 22 are provided at the second portion 3Bb and the slope portion 3Bc of the housing 3. As can be understood from FIGS. 15 and 16, the vent holes 22 are located above an end (edge, or side) 2j on the upper side of various portions of the second support 2b, and are exposed without being covered by the docking station 2. Consequently, as an example, it is easy to prevent the docking station 2 from hampering the air (air flow) through the vent holes 22. The openings 3u of the connectors 21, the opening 17a of the component housing 17 housing the component 16, and the openings 3u of the operation modules 20 provided at the housing 3 are also exposed. Therefore, in the present embodiment, as an example, it is easy to prevent the docking station 2 from hampering access and operation of parts or fingers to the openings 3u and 17a. In addition, with the above-described configuration, the second portion 3Bb which is an example of a region with large heat generation in the housing 3 is exposed from the docking station 2. Consequently, as an example, a heat radiation property is likely to be higher than in the case in which the second portion 3Bb is covered by the docking station 2. Also, as an example, the cooling efficiency can easily be increased.

Figure 19:
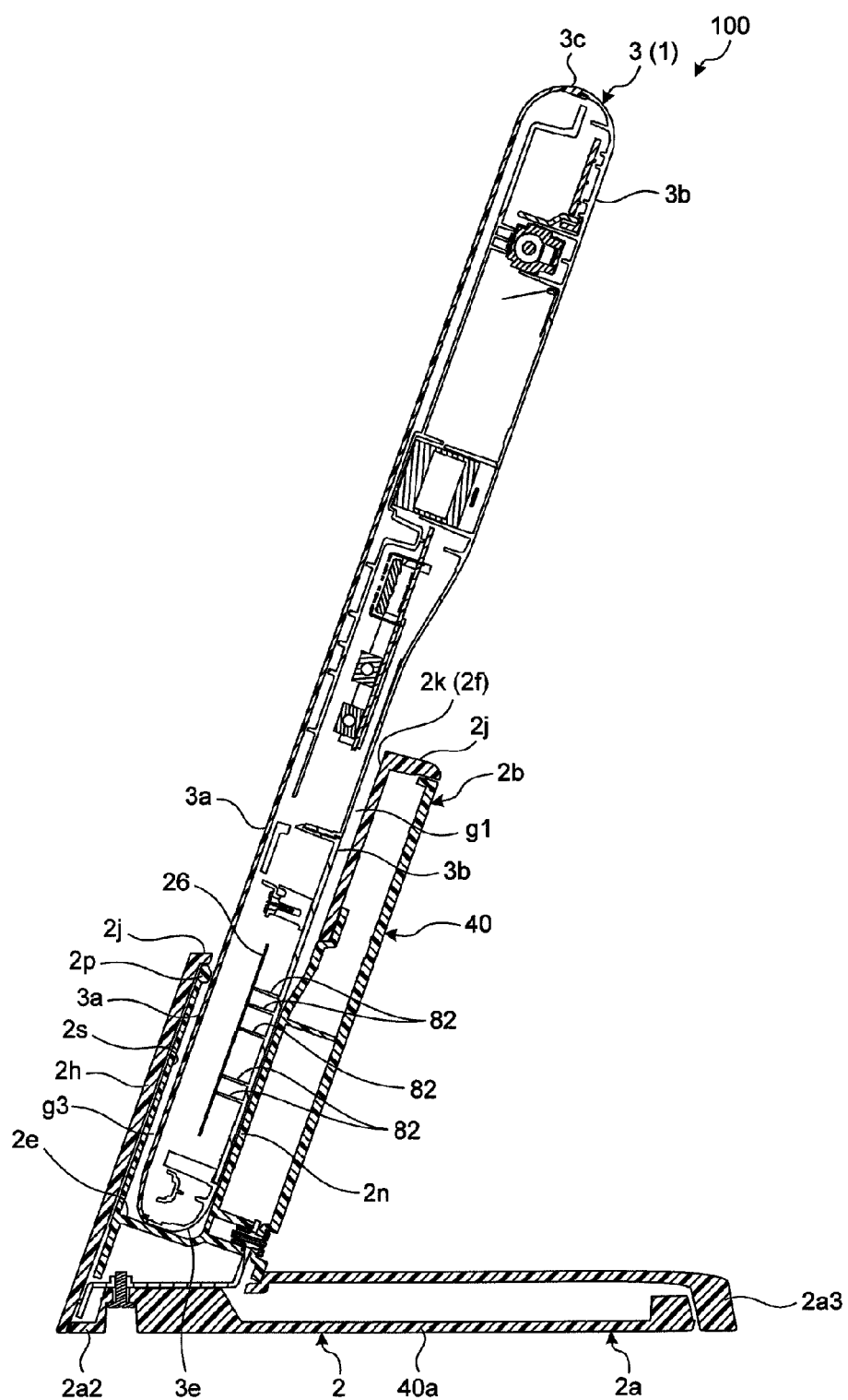
FIG. 19 is an exemplary cross sectional view taken along XIX-XIX in FIG. 5, in the second embodiment.

In the present embodiment, as an example, as illustrated in FIGS. 15, 17, and 19, a surface (front surface) 2k of the wall 2f supporting the housing 3 is provided with projections (protrusions) 2m and 2n. Specifically, as illustrated in FIG. 17, a plurality (two as an example in the present embodiment) of such projections 2m are arranged with a space therebetween along the end 2j of the wall 2f. The projections 2m extend each with a substantially constant width along an in-out direction (forward-backward direction, insertion direction, insertion-removal direction, or mounting direction) I of the housing 3 relative to the docking station 2. As illustrated in FIG. 15, an outer edge (end edge, front edge, top end, or front end) of each of the projections 2m is curved so as to form a convex shape toward the direction of a normal line from the wall 2f. In addition, as illustrated in FIG. 17, a plurality (two as an example in the present embodiment) of such projections 2n are each located along an end meeting the wall 2g. The projections 2n extend each with a substantially constant width along the in-out direction I of the housing 3 relative to the docking station 2. As illustrated in FIG. 19, an outer edge (end edge, front edge, top end, or front end) of each of the projections 2n extends in a planar manner along the surface 2k of the wall 2f in parallel with the surface 2k. The projections 2m and 2n come in contact with the rear surface (surface, or second surface) 3b of the housing 3. The projections 2m and 2n are provided at different locations from each other with spaces therebetween along the in-out direction of the housing 3 relative to the docking station 2, and are also provided at different locations from each other with spaces therebetween along the direction perpendicular to the in-out direction. Consequently, according to the present embodiment, as an example, the housing 3 of the television receiver 1 located in the predetermined position is supported from behind (rear side, rear surface side, back surface side, or side behind) in a more stable manner by the projections 2m and 2n which are arranged at the plurality of locations with spaces therebetween. As illustrated in FIG. 19, the projections 2m and 2n provide a space between the surface 2k of the wall 2f and the rear surface 3b of the housing 3, and thus, provide a gap g1 between the surface 2k and rear surface 3b. Consequently, in the present embodiment, as an example, the housing 3 of the television receiver (electronic device) 1 is prevented from being difficult to move relative to the docking station 2 due to increase in frictional force caused by contact between the surface 2k and rear surface 3b. In addition, as an example, an air flow in the gap g1 is likely to be ensured, and thus, the cooling performance can easily be increased by that much. In the present embodiment, as an example, as illustrated in FIG. 19, a back side (rear side, rear surface side, back surface side, or side behind) of the wall 2h is provided with a projection 2p. The projection 2p comes in contact with the front surface (surface, or first surface) 3a of the housing 3. A gap g3 is provided between the surface 3a of the housing 3 and a surface (back surface, or rear surface) 2s of the wall 2h. The projection 2p can also contribute to more stable holding of the housing 3 of the television receiver 1 in the predetermined position.

In the present embodiment, as an example, as illustrated in FIG. 17, the wall 2e is provided with an opening 2r, and the connector 43 is exposed from the opening 2r while projecting above the wall 2e. The connector 43 enters the housing 3 from the opening 3u of the housing 3 of the television receiver 1 and is connected to the connector 19, thus being electrically connected with the connecter 19. Note that a corner serving as a side end as well as a leading end of the connector 43 is provided with a projection (protrusion, or guide; not illustrated) serving as a guide at the time of connection with the connector 19.

Figure 20:
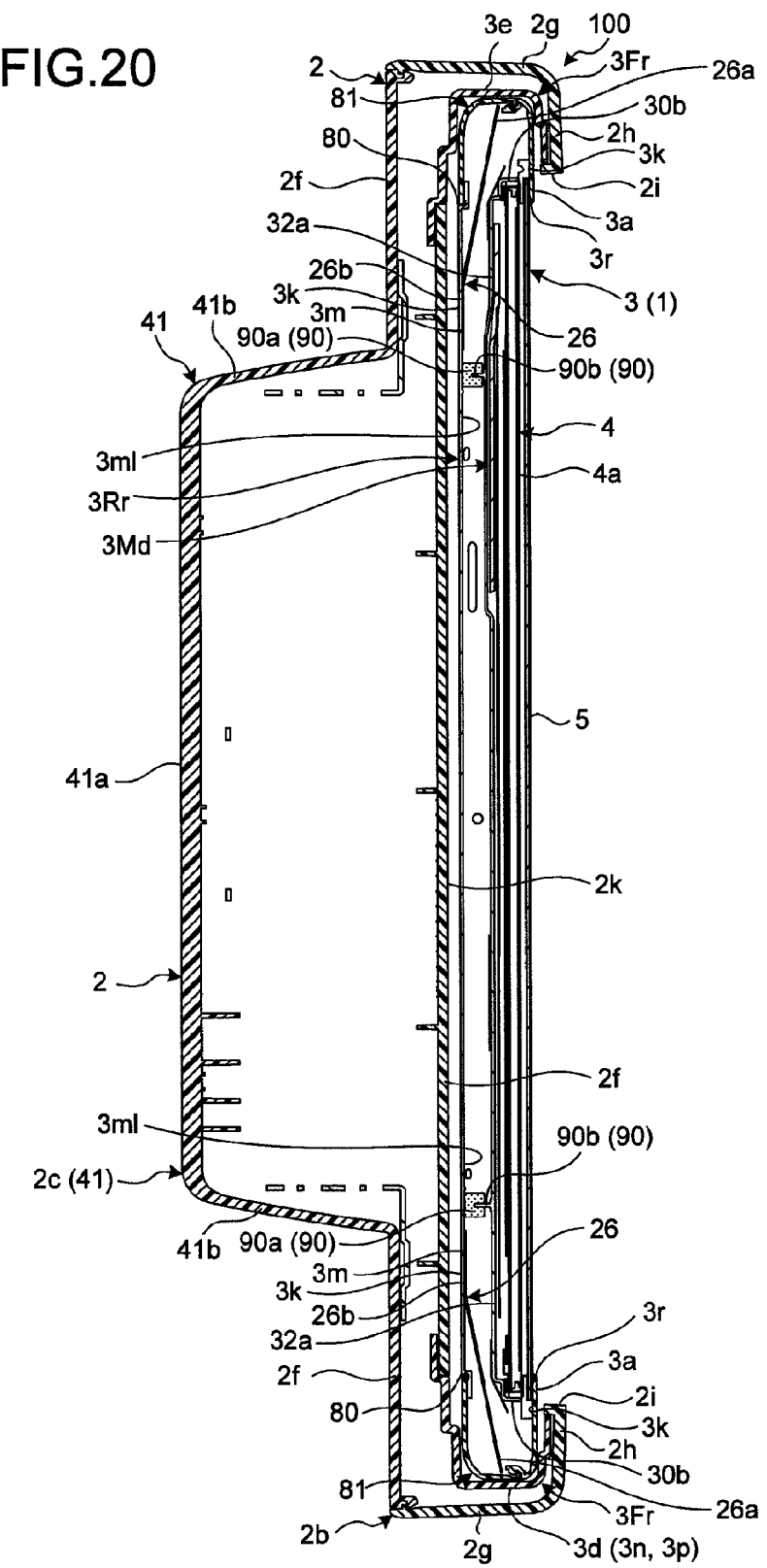
FIG. 20 is an exemplary cross sectional view taken along XX-XX in FIG. 5, in the second embodiment.

In the present embodiment, as an example, the walls 2g and 2h illustrated in FIGS. 19 and 20 are composed of a nonconductor (nonconductive material, such as synthetic resin material as an example). The antennas 26 are located at portions of the television receiver 1 corresponding to the walls 2g and 2h when the television receiver 1 is mounted on the docking station 2. Consequently, according to the present embodiment, as an example, it is easy to prevent the communication performance of the antennas 26 from being degraded. That is, in the present embodiment, as an example, the portions corresponding to the antennas 26 are electromagnetically exposed (not covered by a conductor) at least on one side (in the present embodiment, as an example, on the front and lateral sides in the front view of the display screen 4a in the state in which the television receiver 1 is mounted on the docking station 2).

In the present embodiment, as an example, as illustrated in FIG. 15, the component housing 41 comprises a wall (upper wall, top wall, or first wall portion) 41a located above, walls (side walls, vertical walls, standing walls, or second wall portions) 41b located on both the right and left sides in the rear view (front view), and a wall (rear wall, back wall, or second wall portion) 41c located behind (on the side behind). The walls 41b are examples of ends on the lateral sides of the component housing 41. The wall 41c is an example of an end behind the component housing 41.

Figure 16:
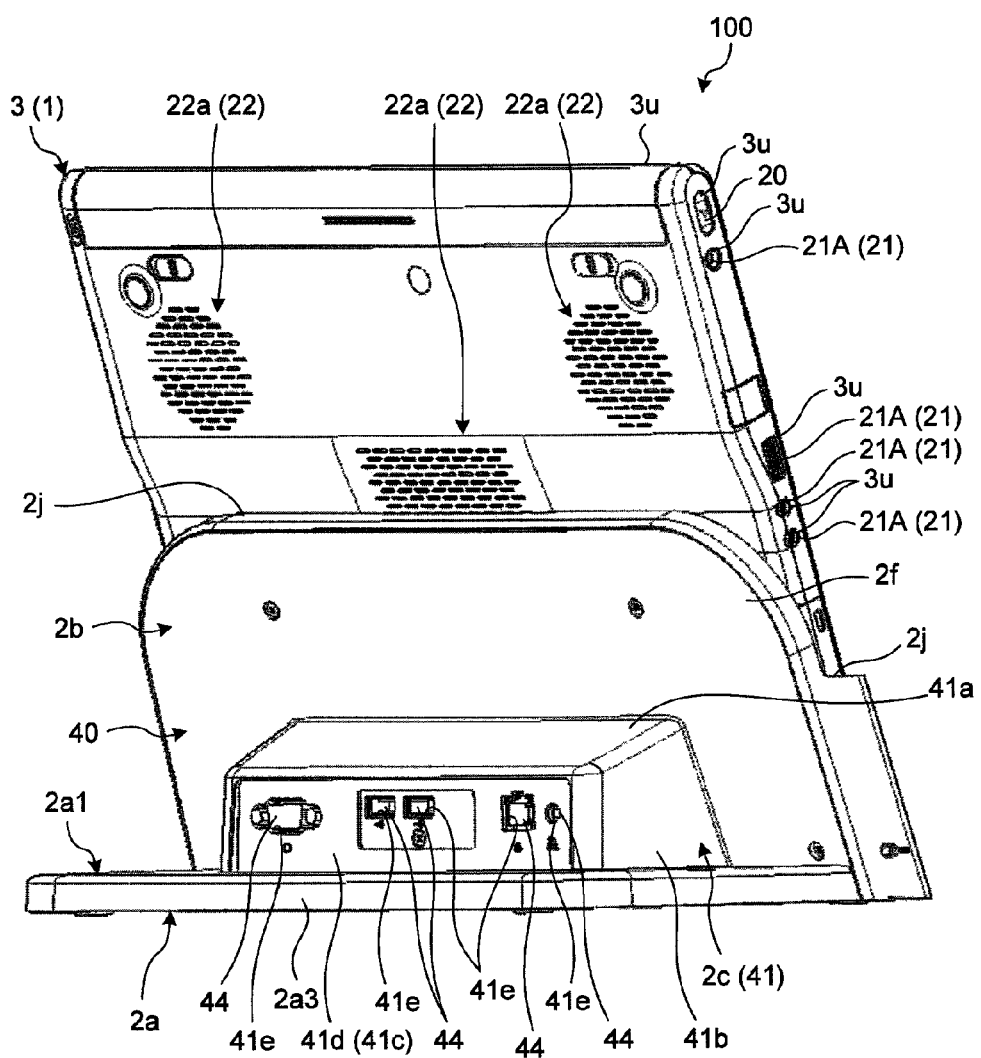
FIG. 16 is an exemplary perspective view illustrating the state in which the television receiver is held by the docking station, as viewed from behind thereof, in the second embodiment.
Figure 18:
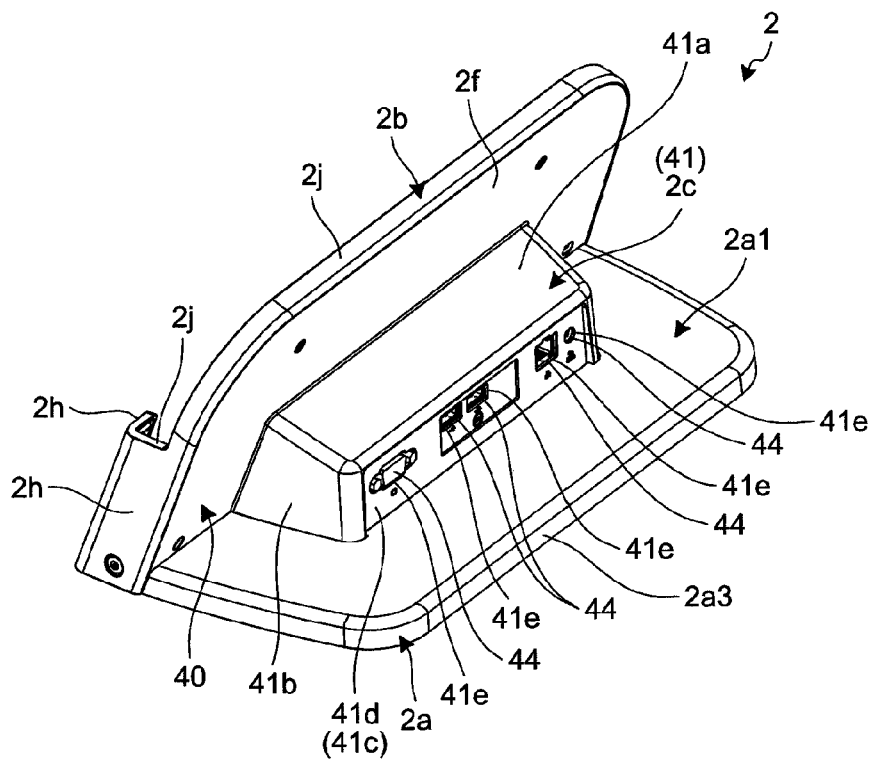
FIG. 18 is an exemplary perspective view of the docking station, as viewed from the upper side thereon in another angle, in the second embodiment.

In the present embodiment, as an example, as illustrated in FIGS. 16 and 18, the connectors 44 are exposed from openings 41e provided at a surface 41d of the wall 41c of the component housing 41 (housing 40). In the present embodiment, as an example, the end 2a3 of the first support 2a is located on the open side of the connectors 44 (on the open side of the openings 41e, or on the opening side; in the present embodiment, as an example, on the rear side) with a space from the wall 41c (surface 41d, or end). That is, in the present embodiment, as an example, the first support 2a is provided, on the rear side of the wall 41c, with a projection (overhang, flange, extension, peripheral side, peripheral edge, bottom, bed, leg, or wall) 2a1. Although the projection 2a1 is provided in a flat plate shape as an example in the present embodiment, it can be configured to have various shapes. For example, the projection 2a1 can have a strip shape, a bar shape, a mesh shape, and a ring shape, or can be provided with openings, such as cutouts and through-holes, as well as undulated portions. In the present embodiment, as an example, the projection 2a1 covers from below such things as connectors and cables (wire harnesses, or wiring) not illustrated connected to the connectors 44. That is, the projection 2a1 is an example of a cover (cover portion, or protector). Because the projection 2a1 projects from the wall 41c, the connectors, cables, or the like connected to the connectors 44 are prevented from being touched by other objects (such as walls, equipment, and components). That is, the projection 2a1 is an example of a suppressing portion (protector). The projection 2a1 also extends along the placing surface P (refer to FIG. 15) in a direction intersecting with the rearward direction (in the orthogonal direction, that is, in the right-left direction in the front and rear views, as an example in the present embodiment). That is, the projection 2a1 also projects in the lateral direction from the wall 41b. Consequently, as an example, it is easy to ensure a space (region) through which the connectors and cables pass above the projection 2a1. Note that the projection 2a1 can comprise mechanisms (such as projections, walls, recesses, grooves, locking portions, and hooks) for hooking and fixing the cables. In addition, the walls 41b may be provided with the openings 41e, and the connectors may be exposed from the openings 41e.

Figure 21:
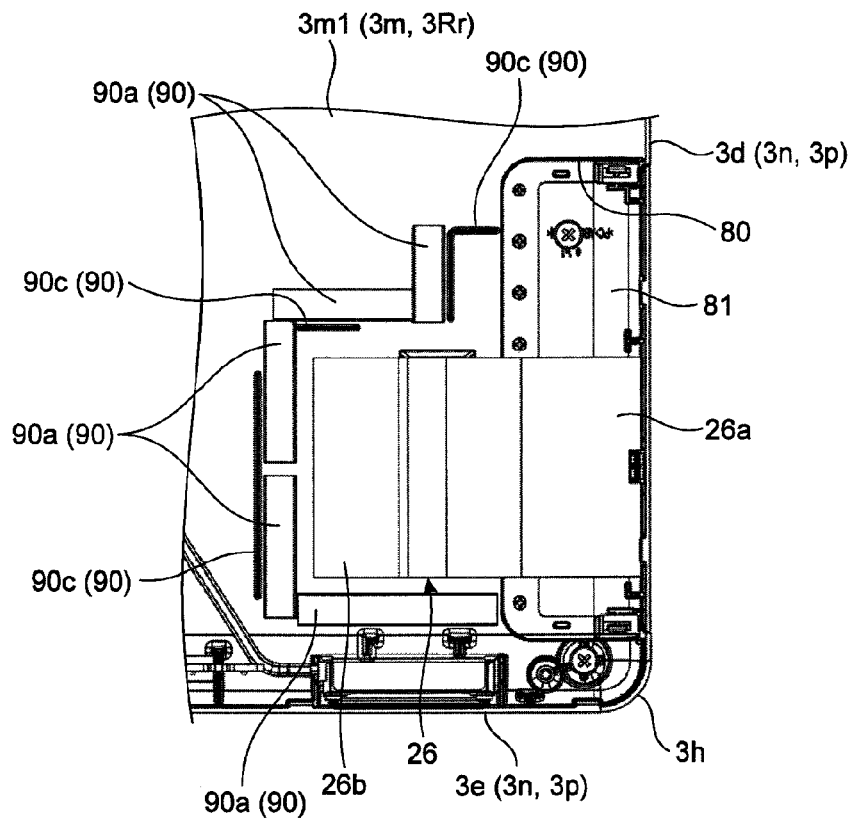
FIG. 21 is an exemplary front view of an internal configuration of a part of a television receiver according to a first modification.
Figure 22:
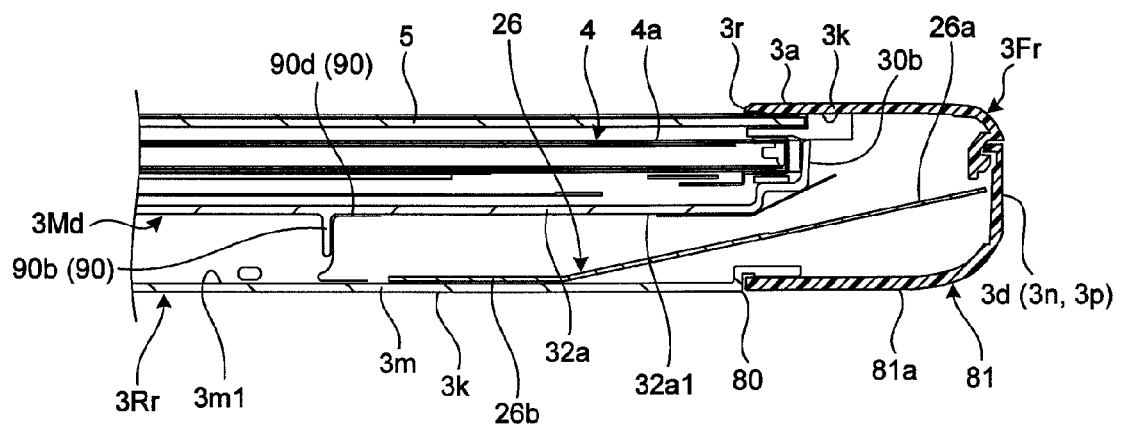
FIG. 22 is an exemplary cross sectional view of a television receiver according to a second modification.
Figure 23:
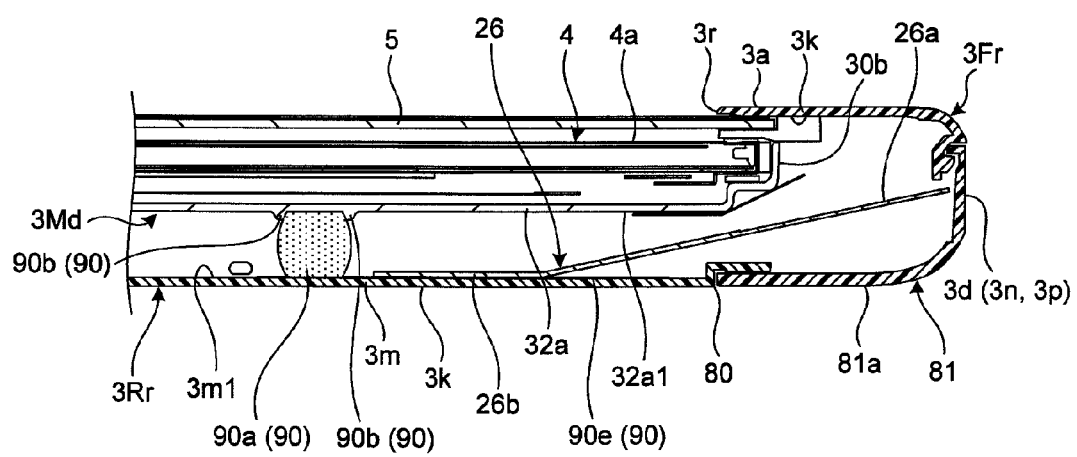
FIG. 23 is an exemplary sectional view of a television receiver according to a third modification.

Although the embodiments have been described above, they are merely examples. Embodiments are not limited to the above-described ones, and various variations are possible. For example, as illustrated in FIG. 21, the shield 90 (member 90a) can be provided along three peripheral edges of the antenna 26 (ground portion 26b). Alternatively, although not illustrated, the shield 90 (member 90a) can be provided along one peripheral edge. The shield 90 may have, as illustrated in FIGS. 22 and 23, other electrically conductive configurations (for example, composed of a film, a foil, a sheet, a cloth, a tape, or paint; an electrically conductive tape 90d in FIG. 22, and a layer of electrically conductive paint 90e in FIG. 23). In FIGS. 22 and 23, the single shield 90 (the tape 90d in FIG. 22, and the member 90a in FIG. 23) is provided in a bridging manner between the two walls 3m and 32a. In the example of FIG. 23, even if the wall 3m is made of insulating material such as synthetic resin material, the same shielding effect as that of the above-described embodiments is obtained by providing the electrically conductive layer 90e on the surface 3m1. The same effect is also obtained, for example, by pasting an aluminum foil (film) or the like. The same applies even if the wall 32a is made of insulating material such as synthetic resin material. Various configurations can be employed as a fixing structure (mounting structure) of the shield. If the member 90a has flexibility (elasticity), it can be held more tightly by being sandwiched between the two walls 3m and 32a, as illustrated in FIG. 23. The technical features of the above-described embodiments can be combined as appropriate and put into practice. The specifications (such as structure, type, direction, shape, size, length, width, thickness, height, number, arrangement, position, and material) of each of the components can be changed as appropriate and put into practice.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An electronic device comprising:
a display device comprising a display screen;
a circuit board located at a side of the display device opposite the display screen;
a housing configured to house the display device and the circuit board;
an antenna provided in the housing and comprising a communication portion and a ground portion;
a shield provided along a periphery of the ground portion in the housing, and located between the antenna and the circuit board;
a first wall provided in the housing, configured to have an electrical conductivity, and configured to cover the side of the display device opposite the display screen; and
a second wall provided in the housing, configured to have an electrical conductivity, configured to cover the side of the display device opposite the display screen, and configured to be located between the display device and the first wall, wherein
at least a part of the antenna is located between the first wall and the second wall, and
the shield is provided in a bridging manner between the first wall and the second wall.
2. The electronic device of claim 1, wherein the shield comprises a projection projecting from a wall in the housing.

3. The electronic device of claim 1, wherein the shield comprises a member bonded with an electrically conductive adhesive to the wall of the housing.

4. The electronic device of claim 1, wherein
the circuit board is located near an end of the housing, and the antenna is located near a second end opposite the end.

5. The electronic device of claim 4, wherein the antenna is located near a corner located at an end in a lengthwise direction of the second end.

6. The electronic device of claim 1, wherein the circuit board is located between the first wall and the second wall.

7. The electronic device of claim 1, wherein the shield comprises:
 a first portion configured to be provided at one of the first wall and the second wall and to have flexibility; and
 a second portion configured to be provided at other one of the first wall and the second wall, and to abut against the first portion.

8. The electronic device of claim 1, wherein
the ground portion comprises a portion overlapping at least one of the first wall and the second wall, and
the communication portion comprises a portion overlapping neither one of the first wall and the second wall.

9. The electronic device of claim 8, wherein
the first wall comprises an opening,
the opening is covered with a member having a lower electrical conductivity than that of the first wall, and
the communication portion overlaps the member having the lower electrical conductivity than that of the first wall.

10. An electronic device comprising:
a display device comprising a display screen;
a circuit board located at a side of the display device opposite the display screen;
a housing configured to house the display device and the circuit board;
an antenna provided in the housing and comprising a communication portion and a ground portion;
a shield provided along a periphery of the ground portion in the housing, and located between the antenna and the circuit board;
a first wall provided in the housing, configured to have an electrical conductivity, and configured to cover the side of the display device opposite the display screen; and
a second wall provided in the housing, configured to have an electrical conductivity, configured to cover the side of the display device opposite the display screen, and configured to be located between the display device and the first wall, wherein
 at least a part of the antenna is located between the first wall and the second wall, and
 the shield is provided between the first wall and the second wall.

11. An electronic device comprising:
a display device comprising a display screen;
a circuit board located at a side of the display device opposite the display screen;
a housing configured to house the display device and the circuit board;
an antenna provided in the housing;
a shield provided along a periphery of the antenna, and located between the antenna and the circuit board;
a first wall provided in the housing, and configured to have an electrical conductivity; and
a second wall provided in the housing, configured to have an electrical conductivity, and provided with a space with respect to the first wall, wherein
 at least a part of the antenna is located between the first wall and the second wall, and
 the shield is provided between the first wall and the second wall.

12. The electronic device of claim 11, wherein the shield comprises a projection projecting from a wall in the housing.

13. The electronic device of claim 11, wherein the shield comprises a member bonded with an electrically conductive adhesive to the wall of the housing.

14. The electronic device of claim 11, wherein
the circuit board is located near an end of the housing, and the antenna is located near a second end opposite the end.

15. The electronic device of claim 14, wherein the antenna is located near a corner located at an end in a lengthwise direction of the second end.

16. The electronic device of claim 11, wherein the circuit board is located between the first wall and the second wall.

17. The electronic device of claim 11, wherein the shield comprises:
 a first portion configured to be provided at one of the first wall and the second wall and to have flexibility; and
 a second portion configured to be provided at other one of the first wall and the second wall, and to abut against the first portion.

18. The electronic device of claim 11, wherein
the ground portion comprises a portion overlapping at least one of the first wall and the second wall, and
the communication portion comprises a portion overlapping neither one of the first wall and the second wall.

19. The electronic device of claim 18, wherein
the first wall comprises an opening,
the opening is covered with a member having a lower electrical conductivity than that of the first wall, and
the communication portion overlaps the member having the lower electrical conductivity than that of the first wall.

* * * * *